(12) United States Patent
Amanai et al.

(10) Patent No.: US 6,687,029 B2
(45) Date of Patent: Feb. 3, 2004

(54) VIEWING OPTICAL SYSTEM AND IMAGE PICKUP OPTICAL SYSTEM AND APPARATUS USING THE SAME

(75) Inventors: Takahiro Amanai, Sagamihara (JP); Tetsuhide Takeyama, Hachioji (JP); Masachika Watanabe, Tokyo (JP)

(73) Assignee: Olympus Corporation, Tokyo (JP)

( * ) Notice: Subject to any disclaimer, the term of this patent is extended or adjusted under 35 U.S.C. 154(b) by 50 days.

(21) Appl. No.: 10/125,719

(22) Filed: Apr. 19, 2002

(65) Prior Publication Data
US 2003/0034935 A1 Feb. 20, 2003

(30) Foreign Application Priority Data
Apr. 20, 2001 (JP) ........................................ 2001-122835

(51) Int. Cl.$^7$ ................................................. G03H 1/00
(52) U.S. Cl. .............................. 359/13; 359/14; 359/15; 359/630; 345/8
(58) Field of Search ...................... 359/13–16, 630–633; 345/7–9

(56) References Cited

U.S. PATENT DOCUMENTS

| | | | |
|---|---|---|---|
| 4,874,214 A | 10/1989 | Cheysson et al. | 350/3.7 |
| 5,093,567 A | 3/1992 | Staveley | 250/221 |
| 5,453,877 A | 9/1995 | Gerbe et al. | 359/633 |
| 5,539,578 A | 7/1996 | Togino et al. | 359/630 |
| 5,708,529 A | 1/1998 | Togino et al. | 359/630 |
| 6,352,346 B1 * | 3/2002 | Kasai | 353/98 |
| 6,429,954 B1 * | 8/2002 | Kasai | 359/13 |
| 6,594,085 B2 * | 7/2003 | Ohtaka et al. | 359/631 |

FOREIGN PATENT DOCUMENTS

| | | | |
|---|---|---|---|
| JP | 7-140414 | 11/1993 | G02B/27/02 |
| JP | 09-171151 | 6/1997 | G02B/27/02 |
| JP | 2000-180787 | 6/2000 | G02B/27/22 |
| JP | 2000-241751 | 9/2000 | G02B/27/02 |

* cited by examiner

*Primary Examiner*—Drew Dunn
*Assistant Examiner*—Fayez Assaf
(74) *Attorney, Agent, or Firm*—Kenyon & Kenyon

(57) ABSTRACT

A viewing optical system for display apparatus, includes an ocular optical member for leading an observation image formed by an observation image forming member to an exit pupil has a first prism member and a second prism member. The first prism member has a first entrance surface, a reflecting surface and a first exit surface disposed to face each other across a first prism medium. The second prism member has a second entrance surface and a second exit surface disposed to face each other across a second prism medium. The first and second prism members are cemented together with a holographic element interposed between the first exit surface and the second entrance surface. The reflecting surface has a positive power. The first exit surface and the second entrance surface are each formed from a plane or cylindrical surface. The holographic element also has a plane of cylindrical surface.

48 Claims, 22 Drawing Sheets

FIG. 23(a)
FIG. 23(b)
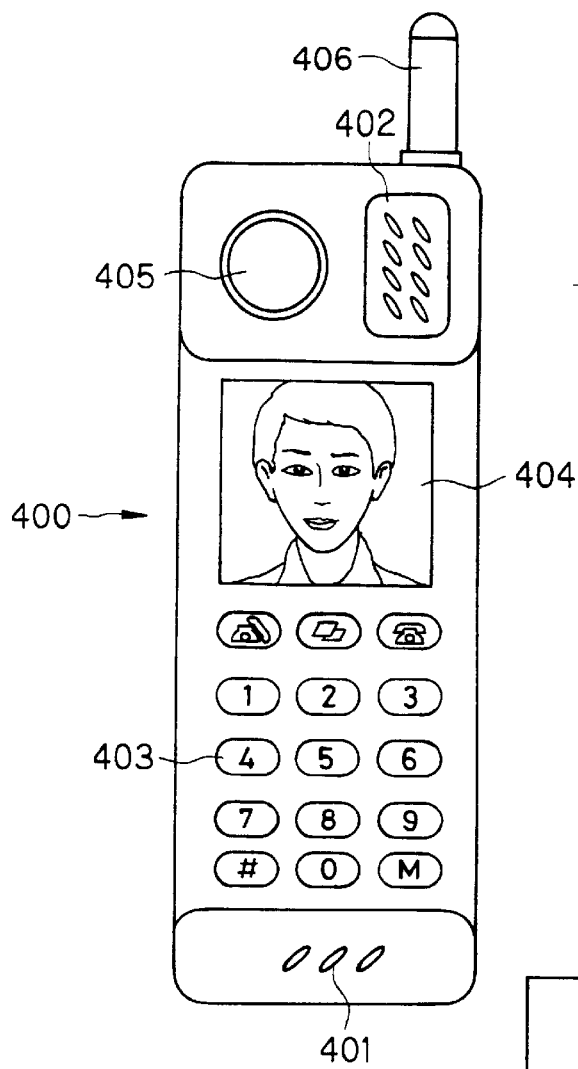
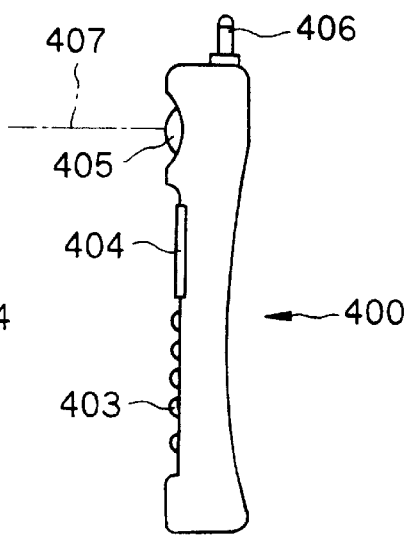
FIG. 23(c)
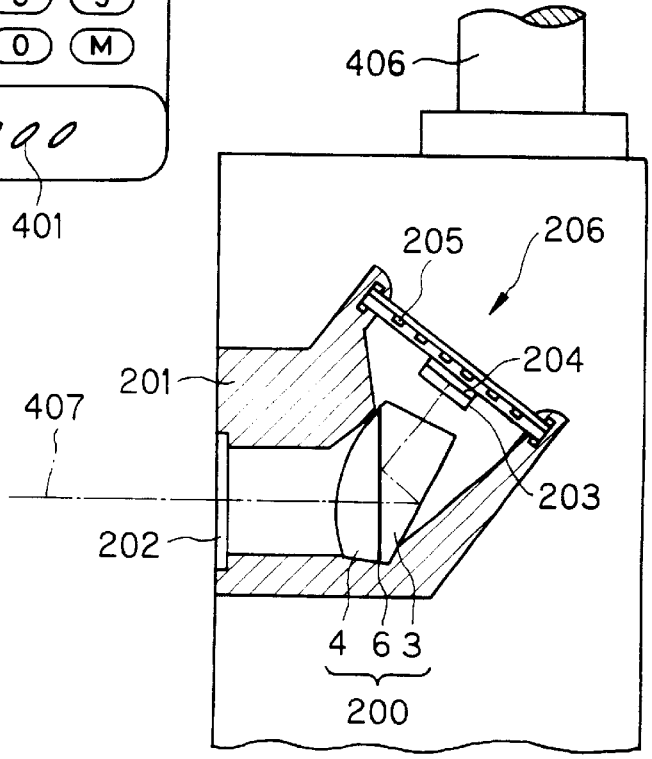

ature radius R) in the optical system.
VIEWING OPTICAL SYSTEM AND IMAGE PICKUP OPTICAL SYSTEM AND APPARATUS USING THE SAME This application claims benefit of Japanese Patent Application No. 2001-122835 filed in Japan on Apr. 20, 2001, the contents of which are incorporated by this reference.

BACKGROUND OF THE INVENTION

The present invention relates to a viewing optical system and an image pickup optical system and also pertains to an apparatus using the viewing optical system and/or the image pickup optical system. More particularly, the present invention relates to an optical system for use in an image display apparatus or the like that can be retained on an observer's head or face and can also be added to a portable telephone or a portable information terminal.

In recent years, image display apparatus, particularly head- or face-mounted image display apparatus, have been developed actively for the purpose of enabling the user to enjoy viewing wide-screen images personally. Meanwhile, portable telephones have recently become widespread, and there have been increasing demands that portable information terminals should display images and character data on a large screen.

Under these circumstances, Japanese Patent Application Unexamined Publication Numbers [hereinafter referred to as "JP(A)"] Hei 7-140414 and Hei 9-171151 propose an optical system using a half-mirror as an oblique mirror for branching an optical path in a prism optical system including a concave mirror having a small amount of decentration.

U.S. Pat. No. 5,093,567 and JP(A) 2000-241751 and 2000-180787 propose an optical system in which a first prism having a triangular configuration and a convex lens action is disposed on the eye side of the optical system, and a second prism is disposed to face the first prism across a small air space. These conventional techniques propose a viewing optical system that folds an optical path without loss of light quantity by making use of a total reflection phenomenon occurring owing to the refractive index difference between glass and air produced by the presence of the small air space between the two prisms.

U.S. Pat. No. 4,874,214 proposes a viewing optical system using a holographic element. In this viewing optical system, holographic elements are used at two places, i.e. on an oblique mirror surface that is a plane surface, and on a spherical substrate surface.

In the above-mentioned JP(A) Hei 7-140414 and Hei 9-171151, an oblique mirror disposed in a prism optical system is formed from a half-mirror. With this arrangement, light emitted from an image display device passes through the half-mirror twice. Therefore, the amount of light reduces to ¼, and thus the displayed image becomes unfavorably dark. In order to prevent this problem, it is necessary to illuminate the image display device by using bright illumination or the like consuming more electric power. In a case where the luminance of the light source cannot be increased owing to power consumption or the capability of the light source device, it becomes impossible to view the displayed image under the bright sun.

In the viewing optical systems proposed in U.S. Pat. No. 5,093,567 and JP(A) 2000-241751 and 2000-180787, it is necessary to adjust the optical axes of the two prisms with respect to each other because a small air space is provided between the prisms. Therefore, the assembly cost increases. Further, it is likely that the optical axes of the two prisms will be displaced from each other when an impact or vibration is applied to an apparatus including the viewing optical system.

The optical system proposed in U.S. Pat. No. 5,093,567 is a relay optical system and hence large in size and heavy in weight. Therefore, it is difficult to use the optical system in a portable telephone or a portable information terminal.

The viewing optical system proposed in U.S. Pat. No. 4,874,214 has a spherical holographic element on a spherical surface. Incidentally, a holographic element has two different kinds of optical power, i.e. an optical power derived from a geometrical configuration, and an optical power based on the diffractive effect of the holographic element. Two different kinds of power obtained when a holographic element is provided on a substrate member having a spherical surface, for example, will be explained below with reference to FIGS. 29(a) and 29(b). As shown in FIG. 29(a), the holographic element has a power based on the difference in density of interference fringes, e.g. the pitch of periodic structures in the holographic element. In addition, the holographic element has an optical power derived from the geometrical configuration thereof, as shown in FIG. 29(b). Regarding the optical power based on the geometrical configuration, the optical powers Φ of a conventional optical refractive lens and conventional reflecting mirrors can be calculated according to the following equations:

| Refracting system: | Φ = (n−1) (1/R) |
| Surface-coated mirror: | Φ = 2/R |
| Back-coated mirror: | Φ = 2n/R | where Φ: the optical power based on the geometrical configuration
n: the refractive index of the medium
R: the radius of curvature of the hologram substrate Accordingly, it will be understood from a comparison of the surface-coated mirror with the back-coated mirror that the back-coated mirror can obtain a given optical power based on the geometrical configuration with a gentler curvature (larger curvature radius R) by 1/n than in the case of the surface-coated mirror.

That is, even if the geometrical configuration of a reflection type holographic element is formed with a gentle curvature (large curvature radius R), it is possible to obtain a large optical power based on the geometrical configuration by filling the inside of the holographic element with a medium having a refractive index n, e.g. a glass or plastic material, as in the case of the back-coated mirror.

Thus, aberrations occurring at the hologram surface can be suppressed by employing an arrangement that allows a large optical power to be produced with a gentle curvature (large curvature radius R) in the optical system.

However, in the viewing optical system stated in the above-mentioned U.S. Pat. No. 4,874,214, the space between the plane surface and the spherical surface is not filled with a glass or plastic medium. Therefore, it is necessary to form the geometrical configuration with a reduced curvature radius R in order to ensure the required optical power derived from the geometrical configuration having a spherical shape.

When the geometrical configuration is formed with a reduced curvature radius R, aberrations occurring at this reflecting surface increase, and it becomes difficult to effect favorable image display. Further, because there is no optical surface in the optical path between the image plane and the above-described plane surface, it is difficult to correct distortion favorably.

Further, the hologram surface in U.S. Pat. No. 4,874,214 is a spherical surface. In general, methods of bonding a hologram are divided into one type in which a film-shaped hologram is bonded to a substrate surface, and another type in which a substrate surface is sprayed with a liquid photopolymer or the like as a hologram recording material. The latter method needs to carry out exposure and development after the spraying process. Considering mass-productivity, it is preferable to adopt the method wherein a film-shaped holographic element is bonded to a substrate because this method allows exposure and development to be performed before the holographic element is bonded to the substrate.

However, film-shaped holograms supplied from manufacturers are, in general, plane holograms. It is not easy to bond a film-type holographic element on a three-dimensional curved surface uniformly.

SUMMARY OF THE INVENTION

The present invention was made to solve the above-described problems with the prior art.

An object of the present invention is to provide a viewing optical system for image display apparatus that allows observation of a bright displayed image favorably corrected for aberrations and is easy to assemble, resistant to impact such as vibration, lightweight and compact, and also provide an image pickup optical system and an apparatus using the viewing optical system and/or the image pickup optical system.

To attain the above-described object, the present invention provides a viewing optical system having an observation image forming member for forming an observation image to be viewed by an observer and an ocular optical member for leading the observation image formed by the observation image forming member to an exit pupil formed at the position of an observer's eyeball.

The ocular optical member includes at least a first prism member and a second prism member.

The first prism member has, at least, a first entrance surface through which light rays from the observation image enter the first prism member, a reflecting surface reflecting the light rays within the first prism member, and a first exit surface through which the light rays exit the first prism member. The first entrance surface, the reflecting surface and the first exit surface are disposed to face each other across a first prism medium.

The second prism member has, at least, a second entrance surface through which the light rays exiting from the first prism member enter the second prism member, and a second exit surface through which the light rays exit the second prism member. The second entrance surface and the second exit surface are disposed to face each other across a second prism medium.

The first prism member and the second prism member are cemented together with a holographic element interposed between the first exit surface and the second entrance surface.

The reflecting surface of the first prism member is a concave surface that gives a positive power to the light rays when reflecting them.

The first exit surface and the second entrance surface are each formed from a plane surface or a cylindrical surface. Alternatively, the first exit surface and the second entrance surface are each formed from a spherical surface or a toric surface satisfying the following conditions:

$$-2.0 < Da/Ra < 2.0 \qquad (2)$$

$$-0.05 < Db/Rb < 0.05 \qquad (3)$$

where Ra and Da are a curvature radius and an outer diameter of the surface in the direction of an axis where the surface has a larger curvature, and Rb and Db are a curvature radius and an outer diameter of the surface in the direction of an axis where the surface has a smaller curvature.

In addition, the present invention provides an image pickup optical system having an image pickup device placed in an image plane to pick up an image of an object, an aperture stop placed in a pupil plane to reduce the brightness of a light beam from the object, and an image-forming optical member disposed between the image plane and the pupil plane to lead the object image to the image plane.

The image-forming optical member includes at least a second prism member and a first prism member.

The second prism member has, at least, a third entrance surface through which light rays emanating from the object and passing through the aperture stop enter the second prism member, and a third exit surface through which the light rays exit the second prism member. The third entrance surface and the third exit surface are disposed to face each other across a second prism medium.

The first prism member has, at least, a fourth entrance surface through which the light rays exiting from the second prism member enter the first prism member, a reflecting surface reflecting the light rays within the first prism member, and a fourth exit surface through which the light rays exit the first prism member. The fourth entrance surface, the reflecting surface and the fourth exit surface are disposed to face each other across a first prism medium.

The second prism member and the first prism member are cemented together with a holographic element interposed between the third exit surface and the fourth entrance surface.

The reflecting surface of the first prism member is a concave surface that gives a positive power to the light rays when reflecting them.

The third exit surface and the fourth entrance surface are each formed from a plane surface or a cylindrical surface. Alternatively, the third exit surface and the fourth entrance surface are each formed from a spherical surface or a toric surface satisfying the following conditions:

$$-2.0 < Da/Ra < 2.0 \qquad (2)$$

$$-0.05 < Db/Rb < 0.05 \qquad (3)$$

where Ra and Da are a curvature radius and an outer diameter of the surface in the direction of an axis where the surface has a larger curvature, and Rb and Db are a curvature radius and an outer diameter of the surface in the direction of an axis where the surface has a smaller curvature.

The reasons for adopting the above-described arrangements in the present invention, together with the functions thereof, will be described below.

First, the viewing optical system will be described.

The viewing optical system according to the present invention has an observation image forming member for forming an observation image to be viewed by an observer and an ocular optical member for leading the observation image formed by the observation image forming member to an exit pupil formed at the position of an observer's eyeball. The ocular optical member includes at least a first prism member and a second prism member. The first prism member has, at least, a first entrance surface through which light rays from the observation image enter the first prism member, a reflecting surface reflecting the light rays within the first prism member, and a first exit surface through which the light rays exit the first prism member. The first entrance surface, the reflecting surface and the first exit surface are disposed to face each other across a first prism medium. The second prism member has, at least, a second entrance surface through which the light rays exiting from the first prism member enter the second prism member, and a second exit surface through which the light rays exit the second prism member. The second entrance surface and the second exit surface are disposed to face each other across a second prism medium.

Thus, the inside of the ocular optical member is filled with a medium, e.g. a glass or plastic material, thereby increasing the optical power based on the surface configuration of each optical functional surface, and thus favorably correcting aberrations, e.g. spherical aberration and comatic aberration.

Further, in the above-described viewing optical system according to the present invention, the first prism member and the second prism member are cemented together with a holographic element interposed between the first exit surface and the second entrance surface.

If a holographic element is used as an oblique mirror for branching an optical path, a diffraction efficiency close to 100% can be obtained when light rays are reflected and diffracted. Thus, it becomes possible to display a bright image without loss of light quantity. If the two prism members, i.e. the prism member closer to the image display device (observation image forming member), and the eye-side prism member, are cemented together into a single member with a holographic element interposed therebetween, it is possible to solve such problems as optical axis displacement that may occur during assembly owing to the presence of an air space, and troublesomeness in setting. Thus, it is possible to attain a viewing optical system easy to assemble and resistant to impact such as vibration.

Further, if the holographic element is cemented between the first prism member and the second prism member, it is possible to keep the holographic element out of dust and hence possible to prevent dust or other foreign matter from being undesirably observed as an enlarged image without the need to provide a dustproof member separately. It is also possible to prevent water from entering the holographic element from the outside, which would otherwise swell the holographic element, causing a change in the peak wavelength of the diffraction efficiency.

Further, in the above-described viewing optical system according to the present invention, the reflecting surface of the first prism member is a concave surface that gives a positive power to the light rays when reflecting them.

Further, the viewing optical system according to the present invention does not form an intermediate image between the image display device and the observer's eye. That is, the viewing optical system has no relay optical system. Therefore, it is constructed in the form of a light-weight and compact viewing optical system.

Further, it is desirable in the viewing optical system according to the present invention that the first entrance surface of the first prism member should have a curved surface configuration that gives a power to light rays when they pass through the surface, and the second exit surface of the second prism member should have a curved surface configuration that gives a power to light rays when they pass through the surface.

Further, it is preferable in the viewing optical system according to the present invention that the first prism medium and the second prism medium should be the same kind of medium.

Further, it is preferable in the viewing optical system according to the present invention that the first exit surface of the first prism member and the second entrance surface of the second prism member should have approximately the same surface configuration.

It should be noted that the term "approximately the same surface configuration" as used herein means that a difference in surface configuration within the range of manufacturing errors is permitted.

Further, it is preferable in the viewing optical system according to the present invention that a ghost light eliminating member that prevents ghost light from entering the observer's eyeball should be provided on a non-optical functional surface other than the optical functional surfaces of the first and second prism members that transmit or reflect light rays.

The ghost light eliminating member is particularly effective when provided on the bottom and side surfaces of the ocular optical member when the first entrance surface of the first prism member is defined as the top surface. The term "non-optical functional surfaces" includes the region outside the ray effective diameter of the first entrance surface, the region outside the ray effective diameter of the reflecting surface of the first prism member, and the region outside the ray effective diameter of the second exit surface of the second prism member. Providing a ghost light eliminating member on each of these regions is also effective.

Further, it is preferable in the viewing optical system according to the present invention that the first entrance surface of the first prism member should have a rotationally asymmetric curved surface configuration.

If a transmitting surface (i.e. the first entrance surface of the first prism member) is disposed in front of an image forming member, e.g. an image display device, as in the present invention, distortion can be corrected favorably. It should be noted that the surface in front of the image forming member may be a rotationally symmetric surface. However, it is even more desirable to use a free-form surface from the viewpoint of correcting decentration aberrations occurring when optical functional surfaces are decentered for the purpose of minimizing the size of the viewing optical system.

Further, it is preferable in the viewing optical system according to the present invention that the rotationally asymmetric curved surface configuration of the first entrance surface of the first prism member should be a free-form surface having only one plane of symmetry, and the plane of symmetry of the free-form surface should be coincident with a plane (YZ-plane) in which the optical axis is folded.

Further, it is preferable in the viewing optical system according to the present invention that the holographic element should be arranged to correct light rays for both rotationally symmetric and rotationally asymmetric components of lateral chromatic aberration by reflection and diffraction.

If the rotationally symmetric and rotationally asymmetric components of lateral chromatic aberration are corrected by a reflection type holographic element, a high contrast can be realized.

In the viewing optical system according to the present invention, the holographic element cemented between the first and second prism members is a reflection type hologram. If the tilt angle of the surface of the holographic element is set at an angle different from 45 degrees with respect to the visual axis (i.e. the axial principal ray reaching the exit pupil from the surface of the viewing optical system closest to the exit pupil), the overall thickness of the viewing optical system can be reduced, and thus a compact and lightweight optical system can be realized. To correct decentration aberrations occurring owing to the arrangement in which an oblique mirror comprising the holographic element is set at an angle different from 45 degrees with respect to the visual axis, free-form surfaces are used as a surface through which light from the image display device enters the prism, a surface reflecting diffracted light from the reflection type holographic element, and a surface in front of the observer's eye. Further, a power is given to the substrate surface configuration of the reflection type holographic element. Thus, coma and field curvature are corrected favorably.

That is, it is important to satisfy the following condition:

$$45° < \theta < 85° \quad (1)$$

where $\theta$ is, as shown in FIG. 24, the angle between a tangential plane at a position A of intersection between the axial principal ray 2 and the substrate surface of the holographic element 6 and the axial principal ray 2 reaching the exit pupil 1 from the surface $4_1$ of the viewing optical system closest to the exit pupil 1.

If the angle $\theta$ is not larger than the lower limit of the condition (1), i.e. 45°, the tilt of the oblique mirror comprising the holographic element becomes excessively small. Consequently, the viewing optical system increases in thickness, resulting in a large and heavyweight optical system. If the angle $\theta$ is not smaller than the upper limit, i.e. 85°, the amount of decentration of the viewing optical system becomes excessively large. Consequently, it is difficult to correct decentration aberrations. Thus, it becomes difficult to observe an image having a high contrast and favorably corrected for distortion.

It is more desirable to satisfy the following condition:

$$55° < \theta < 80° \quad (1-1)$$

The meaning of the lower and upper limits of the condition (1—1) is the same as that of the lower and upper limits of the condition (1).

It is even more desirable to satisfy the following condition:

$$65° < \theta < 75° \quad (1-2)$$

The meaning of the lower and upper limits of the condition (1-2) is the same as that of the lower and upper limits of the condition (1).

In the viewing optical system according to the present invention, the inside of the viewing optical system is filled with a medium, e.g. a glass or plastic material, in the form of the first and second prism members, thereby increasing the optical power based on the surface configuration of each optical functional surface, and thus favorably correcting aberrations, e.g. coma and field curvature.

Incidentally, the reflection type holographic element provided as an oblique mirror in the present invention is, in general, a film-type planar holographic element. It is desirable that the first exit surface of the first prism member and the second entrance surface of the second prism member, each of which serves as a substrate to which the planar holographic element is bonded, should have a plane surface configuration or a cylindrical surface configuration.

It is also possible to use a spherical surface or a toric surface as a substrate to which the planar holographic element is bonded. If the spherical or toric surface satisfies the following conditions, mass-production can be realized by using the planar holographic element:

$$-2.0 < Da/Ra < 2.0 \quad (2)$$

$$-0.05 < Db/Rb < 0.05 \quad (3)$$

where Ra and Da are a curvature radius and an outer diameter of the surface in the direction of an axis where the surface has a larger curvature, and Rb and Db are a curvature radius and an outer diameter of the surface in the direction of an axis where the surface has a smaller curvature.

In the conditions (2) and (3), the lower limits, i.e. −2.0 and −0.05, are limit values in a case where the holographic element is bonded to a concave surface. The upper limits, i.e. 2.0 and 0.05, are limit values in a case where the holographic element is bonded to a convex surface. If Da/Ra and Db/Rb are not within the ranges defined by the conditions (2) and (3), the planar holographic element wrinkles at the peripheral portion of the curved surface. Thus, it becomes difficult to bond the holographic element uniformly and hence impossible to obtain the desired optical performance of the holographic element.

It is more desirable to satisfy the following conditions:

$$-2.0 < Da/Ra < 2.0 \quad (2-1)$$

$$-0.02 < Db/Rb < 0.02 \quad (3-1)$$

The meaning of the lower and upper limits of the conditions (2-1) and (3-1) is the same as that of the lower and upper limits of the conditions (2) and (3).

It is even more desirable to satisfy the following conditions:

$$-2.0 < Da/Ra < 2.0 \quad (2—2)$$

$$-0.015 < Db/Rb < 0.015 \quad (3-2)$$

The meaning of the lower and upper limits of the conditions (2—2) and (3-2) is the same as that of the lower and upper limits of the conditions (2) and (3).

It is preferable in the viewing optical system according to the present invention that the second exit surface of the second prism member should have a rotationally asymmetric curved surface configuration that corrects at least either one of rotationally asymmetric coma and astigmatism produced in the ocular optical member.

Further, it is preferable in the viewing optical system according to the present invention that the rotationally asymmetric curved surface configuration of the second exit surface of the second prism member should be a free-form surface having only one plane of symmetry, and the plane of symmetry of the free-form surface should be coincident with a plane (YZ-plane) in which the optical axis is folded.

It is desirable in the present invention that the surfaces constituting the first prism member and those constituting the second prism member should be rotationally asymmetric surfaces, e.g. free-form surfaces, from the viewpoint of realizing an optical system capable of favorably correcting rotationally asymmetric distortion and exhibiting favorable telecentricity. However, those surfaces may be formed from rotationally symmetric surfaces, e.g. spherical surfaces, aspherical surfaces, or anamorphic surfaces.

In the viewing optical system according to the present invention, a light beam from an observation image formed by the observation image forming member is passed through the first entrance surface to enter the first prism member. The light beam entering the first prism member is made incident on a volume hologram at a first incident angle within the range of angle selectivity of the hologram. After being reflected and diffracted from the hologram, the light beam is reflected by the reflecting surface. The reflected light beam is incident on the volume hologram surface again at a second incident angle. At this time, because the second incident angle is not within the range of angle selectivity of the volume hologram, the diffraction efficiency is extremely low. Consequently, the incident light beam passes through the first exit surface substantially as it is, and enters the second prism member through the second entrance surface.

The light beam entering the second prism member exits the second prism member through the second exit surface as it is, and is then led to the observer's eyeball.

In the viewing optical system according to the present invention, an optical member, e.g. a prism, a plane-parallel plate of glass, or a positive or negative lens, may be disposed between the first entrance surface of the first prism member and the observation image forming member.

Further, in the viewing optical system according to the present invention, an optical member, e.g. a prism, a plane-parallel plate of glass, or a positive or negative lens, may be disposed between the second exit surface of the second prism member and the exit pupil.

In the case of using an image display device, e.g. an LCD (Liquid Crystal Display), it is necessary in order to perform image display with high contrast to enlarge and display an image through an optical system with favorable telecentricity. The described arrangements of the optical system according to the present invention are applicable not only to a viewing optical system but also to an image pickup optical system. In the latter case, when an image pickup device, e.g. a CCD, is used, it is also important to pick up an image through an optical system with favorable telecentricity from the viewpoint of preventing shading or the like.

In the present invention, the eye relief is long relative to the focal length of the entire optical system. Therefore, the extra-axial principal rays are tilted with respect to the image display device in a direction in which the extra-axial light beams converge. To realize an optical system having enhanced telecentricity and an increased eye relief as well as a compact structure, it is desirable to place a negative power in the optical path near the image display device (image pickup device) and a positive power on the eye (object) side.

The above means that the optical system has an arrangement obtained by inverting a retrofocus type optical system. That is, it is important to give a negative power to an oblique mirror surface in the optical system near the image display device. To ensure telecentricity over the whole area of an image field with a difference in length between two orthogonal axis directions, it is particularly important that the oblique mirror surface should have a larger negative power in an axis direction of the aspect ratio in which the oblique mirror surface is longer than in the direction of the other axis.

Let us assume that the length in the X-axis direction of the image display device is Dx, and the length in the Y-axis direction of the image display device is Dy. That is, the aspect ratio of the image display device is denoted by Dx:Dy. Further, the curvature radius in the X-axis direction of the oblique mirror surface is assumed to be Rx, and the curvature radius in the Y-axis direction of the oblique mirror surface is assumed to be Ry. On these assumptions, if the following conditions are satisfied, telecentricity can be ensured to obtain favorable optical performance in a case where there is no displacement in the X-axis direction (this is true of all Examples described later):

$-1.0 \leq Dx/Rx \leq 0$ (4)

$-1.0 \leq Dy/Ry \leq 0$ (5)

If the upper limits of the conditions (4) and (5), i.e. 0, are exceeded, the oblique mirror surface has a positive power. Consequently, the principal rays further tilt in the direction of convergence, and it becomes impossible to capture a high-contrast image from the image display device. If Dx/Rx and Dy/Ry are smaller than the lower limits of the conditions (4) and (5), i.e. −1.0, the image display device is excessively large in size, or the negative power of the oblique mirror surface is excessively large. Consequently, the tilt angle of the principal rays becomes rather divergent. Accordingly, it becomes impossible to capture a high-contrast image from the image display device.

It is more desirable to satisfy the following conditions:

$-0.5 \leq Dx/Rx \leq 0$ (4-1)

$-0.5 \leq Dy/Ry \leq 0$ (5-1)

The meaning of the lower and upper limits of the conditions (4-1) and (5-1) is the same as that of the lower and upper limits of the conditions (4) and (5).

It is even more desirable to satisfy the following conditions:

$-0.1 \leq Dx/Rx \leq 0$ (4-2)

$-0.1 \leq Dy/Ry \leq 0$ (5-2)

The meaning of the lower and upper limits of the conditions (4-2) and (5-2) is the same as that of the lower and upper limits of the conditions (4) and (5).

With the above-described arrangement, a holographic element is provided on an oblique mirror surface having a plane or cylindrical substrate surface configuration. Alternatively, a planar holographic element is provided on an oblique mirror surface having a spherical or toric substrate surface configuration satisfying the conditions (2) and (3) for preventing the planar holographic element from wrinkling at the peripheral portion thereof when bonded to the spherical or toric surface. This arrangement dispenses with the need to provide a half-mirror for branching the optical path or to provide an air space. Accordingly, it is possible to obtain a viewing optical system that allows observation of a bright displayed image favorably corrected for aberrations with minimal loss of light quantity and is easy to assemble, resistant to impact such as vibration, lightweight and compact and further permits a hologram to be bonded easily, and it is also possible to obtain an apparatus using the viewing optical system.

It should be noted that the described arrangements of the optical system according to the present invention are applicable not only to a viewing system but also to an image pickup system.

The image pickup optical system according to the present invention has an image pickup device placed in an image plane to pick up an image of an object, an aperture stop placed in a pupil plane to reduce the brightness of a light beam from the object, and an image-forming optical member disposed between the image plane and the pupil plane to lead the object image to the image plane. The image-forming optical member includes at least a second prism member and a first prism member. The second prism member has, at least, a third entrance surface through which light rays emanating from the object and passing through the aperture stop enter the second prism member, and a third exit surface through which the light rays exit the second prism member. The third entrance surface and the third exit surface are disposed to face each other across a second prism medium. The first prism member has, at least, a fourth entrance surface through which the light rays exiting from the second prism member enter the first prism member, a reflecting surface reflecting the light rays within the first prism member, and a fourth exit surface through which the light rays exit the first prism member. The fourth entrance surface, the reflecting surface and the fourth exit surface are disposed to face each other across a first prism medium. The second prism member and the first prism member are cemented together with a holographic element interposed between the third exit surface and the fourth entrance surface. The reflecting surface of the first prism member is a concave surface that gives a positive power to the light rays when reflecting them.

The third exit surface and the fourth entrance surface are each formed from a plane surface or a cylindrical surface.

Alternatively, the third exit surface and the fourth entrance surface are each formed from a spherical surface or a toric surface satisfying the following conditions:

$$-2.0 < Da/Ra < 2.0 \qquad (2)$$

$$-0.05 < Db/Rb < 0.05 \qquad (3)$$

where Ra and Da are a curvature radius and an outer diameter of the surface in the direction of an axis where the surface has a larger curvature, and Rb and Db are a curvature radius and an outer diameter of the surface in the direction of an axis where the surface has a smaller curvature.

That is, the image pickup optical system according to the present invention is formed by replacing the observation image forming member, the exit pupil and the ocular optical member in the viewing optical system according to the present invention with the image pickup device, the aperture stop and the image-forming optical member, respectively.

It is also preferable in the image pickup optical system to adopt arrangements similar to those of the viewing optical system, e.g. the above-described conditional expressions.

Further, in the viewing optical system according to the present invention, the reflecting surface of the first prism member should preferably be formed by mirror coating.

The reflecting surface of the first prism member may be arranged in the form of a totally reflecting surface that reflects a light beam incident thereon at an angle exceeding the total reflection critical angle but transmits a light beam incident thereon at an angle not exceeding the total reflection critical angle. It is also possible to provide a light-transmitting optical member on the reflecting surface side of the first prism member.

With this arrangement, see-through observation can be performed. Accordingly, the user can continue wearing a head- or face-mounted image display apparatus using the viewing optical system according to the present invention without interference with the normal observation of the outside. Thus, it is possible to save time and effort to put on or take off the head- or face-mounted image display apparatus.

It is also possible to view both an external observation image and an image from the image display device as a superimposed multiple image.

It should be noted that the reflecting surface of the first prism member may be formed from a half-mirror to allow see-through observation.

It is also possible to construct a head-mounted image display apparatus having a body unit containing an image display device and any of the foregoing viewing optical systems according to the present invention arranged as an ocular optical system. The head-mounted image display apparatus further has a support member for supporting the body unit on the head of an observer in such a manner that the exit pupil of the viewing optical system is held at the position of an eyeball of the observer, and a speaker member for giving voice to an ear of the observer.

The above-described head-mounted image display apparatus may be arranged such that the body unit has a viewing optical system for a right eye and a viewing optical system for a left eye, and the speaker member has a speaker member for a right ear and a speaker member for a left ear.

In the head-mounted image display apparatus, the speaker member may be an earphone.

In the viewing optical system according to the present invention, a light ray from the object center that passes through the center of the pupil and reaches the center of the image plane in backward ray tracing is defined as an axial principal ray. In the image pickup optical system according to the present invention, a light rays from the object center that passes through the center of the aperture stop and reaches the center of the image plane in forward ray tracing is defined as an axial principal ray. In the optical system according to the present invention, if at least one reflecting surface is not decentered with respect to the axial principal ray, the axial principal ray travels along the same optical path when incident on and reflected from the reflecting surface, and thus the axial principal ray is intercepted in the optical system undesirably. As a result, an image is formed from only a light beam whose central portion is shaded. Consequently, the center of the image is unfavorably dark, or no image is formed in the center of the image field. For this reason, a decentered prism is used as each prism member in the present invention.

When a reflecting surface with a power is decentered with respect to the axial principal ray, it is desirable that at least one of the surfaces constituting each prism member used in the present invention should be a rotationally asymmetric surface. It is particularly preferable from the viewpoint of correcting aberrations that at least one reflecting surface of the prism members should be a rotationally asymmetric surface.

To use an optical path in a common region repeatedly by folding the optical path, the optical system has to be decentered. However, if the optical system is formed into a decentered optical system in order to fold the optical path, decentration aberrations such as rotationally asymmetric distortion and rotationally asymmetric field curvature occur. To correct the decentration aberrations, a rotationally asymmetric surface is used as stated above.

The rotationally asymmetric surface used in the present invention can be formed from an anamorphic surface, a toric surface, or a plane-symmetry free-form surface having only one plane of symmetry. It is preferable to use a free-form surface having only one plane of symmetry as a rotationally asymmetric surface.

In the present invention, the axial principal ray is defined as follows. In the viewing optical system, a light ray passing through the center of the exit pupil and reaching the center of the observation image forming member in the backward ray tracing is defined as an axial principal ray. In the image pickup optical system, a light ray passing through the center of the aperture stop and reaching the center of the image pickup device in the forward ray tracing is defined as an axial principal ray. An optical axis defined by a straight line along which the axial principal ray travels from the center of the exit pupil or the aperture stop until it intersects the second exit surface of the second prism member is defined as a Z-axis. An axis perpendicularly intersecting the Z-axis in the decentration plane of each surface constituting the second prism member is defined as a Y-axis. An axis perpendicularly intersecting the Z-axis and also perpendicularly intersecting the Y-axis is defined as an X-axis. Further, the center of the exit pupil or the aperture stop is defined as the origin of the coordinate system in the viewing optical system or the image pickup optical system according to the present invention. Further, in the present invention, the surface Nos. are put in the order of backward ray tracing from the exit pupil toward the observation image forming member or in the order of forward ray tracing from the aperture stop toward the image pickup device, as stated above. The direction along which the axial principal ray from the exit pupil reaches the observation image forming member or the direction along which the axial principal ray from the aperture stop reaches the image pickup device is defined as a positive direction of the Z-axis. The direction in which the Y-axis extends toward the observation image forming member or the direction in which the Y-axis extends toward the image pickup device is defined as a positive direction of the Y-axis. The direction in which the X-axis constitutes a right-handed system in combination with the Y- and Z-axes is defined as a positive direction of the X-axis.

Free-form surfaces used in the present invention are defined by the following equation (a). The Z-axis of the defining equation is the axis of a free-form surface.

$$Z = cr^2 / \left[1 + \sqrt{\{1 - (1+k)c^2 r^2\}}\right] + \sum_{j=2}^{\infty} C_j X^m Y^n \tag{a}$$

In Eq. (a), the first term is a spherical surface term, and the second term is a free-form surface term.

In the spherical surface term:
c: the curvature at the vertex
k: a conic constant
$r = \sqrt{(X^2 + Y^2)}$ The free-form surface term is given by $$\sum_{j=2}^{\infty} C_j X^m Y^n = C_2 X + C_3 Y + C_4 X^2 + C_5 XY + C_6 Y^2 +$$

$$C_7 X^3 + C_8 X^2 Y + C_9 XY^2 + C_{10} Y^3 + C_{11} X^4 + C_{12} X^3 Y +$$

$$C_{13} X^2 Y^2 + C_{14} XY^3 + C_{15} Y^4 + C_{16} X^5 + C_{17} X^4 Y + C_{18} X^3 Y^2 +$$

$$C_{19} X^2 Y^3 + C_{20} XY^4 + C_{21} Y^5 + C_{22} X^6 + C_{23} X^5 Y + C_{24} X^4 Y^2 +$$

$$C_{25} X^3 Y^3 + C_{26} X^2 Y^4 + C_{27} XY^5 + C_{28} Y^6 + C_{29} X^7 + C_{30} X^6 Y +$$

$$C_{31} X^5 Y^2 + C_{32} X^4 Y^3 + C_{33} X^3 Y^4 + C_{34} X^2 Y^5 + C_{35} XY^6 + C_{36} Y^7$$

where $C_j$ (j is an integer of 2 or higher) are coefficients, and $j = \{(m+n)^2 + m + 3n\}/2 + 1$ (m and n are integers of zero or higher).

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, productivity can be improved.

It should be noted that the above defining equation (a) is shown as merely an example, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any defining equation other than the above defining equation (a) that expresses such a rotationally asymmetric surface.

In the present invention, the reflecting surface provided in the prism member may be a plane-symmetry free-form surface having only one plane of symmetry.

The configuration of an anamorphic surface is defined by the following equation (b). A straight line passing through the origin of the surface configuration perpendicularly to the optical surface is the axis of the anamorphic surface.

$$Z = (Cx \cdot X^2 + Cy \cdot Y^2)/[1 + \{1 - (1+Kx)Cx^2 \cdot X^2 - (1+Ky)Cy^2 \cdot Y^2\}^{1/2}] + \Sigma Rn\{(1-Pn)X^2 + (1+Pn)Y^2\}^{(n+1)} \tag{b}$$

Assuming that n=4 (polynomial of degree 4), for example, an anamorphic surface may be expressed by an expanded form of the above equation (b) as follows:

$$Z = (Cx \cdot X^2 + Cy \cdot Y^2)/ \tag{c}$$
$$\left[1 + \{1 - (1 + Kx)Cx^2 \cdot X^2 - (1 + Ky)Cy^2 \cdot Y^2\}^{1/2}\right] +$$
$$R1\{(1 - P1)X^2 + (1 + P1)Y^2\}^2 +$$
$$R2\{(1 - P2)X^2 + (1 + P2)Y^2\}^3 +$$
$$R3\{(1 - P3)X^2 + (1 + P3)Y^2\}^4 +$$
$$R4\{(1 - P4)X^2 + (1 + P4)Y^2\}^5$$

where Z is the amount of deviation from a plane tangent to the origin of the surface configuration; Cx is the curvature in the X-axis direction; Cy is the curvature in the Y-axis direction; Kx is the conic coefficient in the X-axis direction; Ky is the conic coefficient in the Y-axis direction; Rn is the rotationally symmetric component of the spherical surface term; and Pn is the rotationally asymmetric component of the aspherical surface term. It should be noted that the radius of curvature Rx in the X-axis direction and the radius of curvature Ry in the Y-axis direction are related to the curvatures Cx and Cy as follows:

$Rx = 1/Cx$, $Ry = 1/Cy$

Toric surfaces include an X-toric surface and a Y-toric surface, which are defined by the following equations (d) and (e), respectively. A straight line passing through the origin of the surface configuration perpendicularly to the optical surface is the axis of the toric surface. The X-toric surface is given by $$F(X) = Cx \cdot X^2 / [1 + \{1 - (1+K)Cx^2 \cdot X^2\}^{1/2}] + AX^4 + BX^6 + CX^8 + DX^{10}$$

$$Z = F(X) + (\tfrac{1}{2})Cy\{Y^2 + Z^2 - F(X)^2\} \tag{d}$$

The Y-toric surface is given by $$F(Y) = Cy \cdot Y^2 / [1 + \{1 - (1+K)Cy^2 \cdot Y^2\}^{1/2}] + AY^4 + BY^6 + CY^8 + DY^{10}$$

$$Z = F(Y) + (\tfrac{1}{2})Cx\{X^2 + Z^2 - F(Y)^2\} \tag{e}$$

In the above equations, Z is the amount of deviation from a plane tangent to the origin of the surface configuration; Cx is the curvature in the X-axis direction; Cy is the curvature in the Y-axis direction; K is a conic coefficient; and A, B, C and D are aspherical coefficients, respectively. It should be noted that the radius of curvature Rx in the X-axis direction and the radius of curvature Ry in the Y-axis direction are related to the curvatures Cx and Cy as follows:

$$Rx = 1/Cx, \; Ry = 1/Cy$$

Holographic elements include two different types, i.e. relief holograms, and volume holograms. Relief holograms have the nature that the incident angle selectivity and wavelength selectivity are low, and they diffract light of specific wavelength incident thereon at a specific angle to form an image by the desired order of light. However, the relief holograms also diffract light of other wavelengths incident thereon at other angles as unwanted orders of light to form an undesired image. On the other hand, the volume holograms have the nature that the incident angle selectivity and wavelength selectivity are high, and hence they diffract only light of specific wavelength incident thereon at a specific angle to form an image by the desired order of light. The volume holograms transmit substantially all the other orders of light as zero-order light and are therefore unlikely to form an undesired image by unwanted orders of light.

Therefore, if a reflection type volume hologram is used as a holographic element in the present invention, it is possible to prevent image blur due to unwanted orders of diffracted light and hence possible to obtain a clear observation image.

It should be noted that a volume hologram (HOE) used as a holographic element in the present invention is defined as follows. FIG. 25 is a principle diagram for defining the HOE in the present invention.

First, tracing of rays of wavelength λ incident on and exiting from the HOE surface is given by the following equation (f) using the optical path difference function $\Phi_0$ on the HOE surface defined with respect to the reference wavelength $\lambda_0 = HWL$:

$$n_d Q_d \times N = n_i Q_i \times N + m(\lambda/\lambda_0) \nabla \Phi_0 \times N \tag{f}$$

where N is the normal vector to the HOE surface; $n_i$ ($n_d$) is the refractive index on the incidence side (exit side); and $Q_i$ ($Q_d$) is the incidence (exit) vector (unit vector). In addition, m=HOR is the order of diffraction of emergent light.

Assuming that the HOE is produced (defined) by two point sources of reference wavelength $\lambda_0$, that is, as shown in FIG. 25, by interference between object light from a light source at point $P_1 = (HX1, HY1, HZ1)$ and reference light from a light source at point $P_2 = (HX2, HY2, HZ2)$, $$\Phi_0 = \Phi_0^{2P} = n_2 \cdot s_2 \cdot r_2 - n_1 \cdot s_1 \cdot r_1$$

where $r_1$ ($r_2$) is the distance (>0) from the point $P_1$ (point $P_2$) to a predetermined coordinate point P on the HOE surface; $n_1$ ($n_2$) is the refractive index of a medium in which the HOE is placed during the production (definition) on the side where the point $P_1$ (point $P_2$) is located; and $s_1 = HV1$ and $S_2 = HV2$ are signs to consider the direction of travel of light. The sign is REA=+1 when the light source is a divergent light source (real point source). Conversely, when the light source is a convergent light source (virtual point source), the sign is VIR=−1. Regarding the definition of the HOE in lens data, the refractive index $n_1$ ($n_2$) of a medium in which the HOE is placed during the production (definition) is the refractive index of a medium with which the HOE surface is in contact on the side where the point $P_1$ ($P_2$) is present in the lens data.

In a general case, reference light and object light used to produce an HOE are not always spherical wave. The optical path difference function $\Phi_0$ of the HOE in this case may be expressed by adding a polynomially-expressed additive phase term $\Phi_0^{Poly}$ (optical path difference function at the reference wavelength $\lambda_0$) as follows:

$$\Phi_0 = \Phi_0^{2P} + \Phi_0^{Poly} \tag{g}$$

In the above equation (g), the polynomial expression is as follows:

$$\Phi_0^{Poly} = \sum_j H_j \cdot x^m \cdot y^n$$
$$= H_1 x + H_2 y + H_3 x^2 + H_4 xy + H_5 y^2 + H_6 x^3 + H_7 x^2 y + H_8 xy^2 + H_9 y^3 + \cdots$$

In general, it may be defined as follows:

$$j = \{(m+n)^2 + m + 3n\}/2$$

In the above expression, $H_j$ is the coefficient of each term.

For the convenience of optical design, the optical path difference function $\Phi_0$ may be expressed by only the additive term to define the HOE as follows:

$$\Phi_0 = \Phi_0^{Poly}$$

For example, if the two point sources $P_1$ ($P_2$) are made coincident with each other, the interference component $\Phi_0^{2P}$ of the optical path difference function $\Phi_0$ is zero. This is equivalent to expressing the optical path difference function substantially only by the additive term (polynomial expression).

It should be noted that the foregoing description of the HOE has been made all with regard to local coordinates based on the HOE origin.

Examples of constituent parameters defining an HOE are as follows:

| Surface No. | Radius of curvature | Surface separation |
|---|---|---|
| Object plane | ∞ | ∞ |
| 1 | ∞ (stop) | 100 |
| 2 | 150 (HOE ①) | −75 |
| HOE ① | | |
| HV1 ($s_1$): REA (+1) | | |
| HV2 ($s_2$): VIR (−1) | | |
| HOR (m): 1 | | |
| HX1 = 0 | HY1 = −3.40 × 10$^9$ | HZ1 = −3.40 × 10$^9$ |
| HX2 = 0 | HY2 = 2.50 × 10 | HZ2 = −7.04 × 10 |
| HWL ($\lambda_0$) = 544 | | |
| $H_1$ −1.39 × 10$^{-21}$ | $H_2$ −8.57 × 10$^{-5}$ | $H_3$ −1.50 × 10$^{-4}$ |

The following is a description of the principle of reflection, diffraction and transmission at the surface of a volume hologram used in the present invention. Regarding the simulation of diffraction efficiency, let us show the simulation of diffraction efficiency for s-polarized light component based on Kogelnik's theory. The simulation was performed on Example 1 (described later). However, this is true of the other examples.

In this example, LED light sources having center wavelengths of 630 nm, 520 nm and 470 nm, respectively, were used as light sources for R, G and B bands, together with narrow-band filters to narrow the bandwidth to about ±5 nm to 10 nm in center wavelength. Let us show the results of calculation of the diffraction efficiency at a volume hologram surface for the axial principal ray in the G band, by way of example. It should be noted that the calculation results were obtained under the conditions that the reference refractive index was 1.5, the refractive index modulation was 0.05, and the thickness of the holographic element was 10 μm. The diffraction efficiency when the angle of incidence of the axial principal ray on the volume hologram surface was 47.3° and the reflection diffraction angle was 46.9° is shown in FIGS. 26 and 27. FIG. 26 is a graph showing the diffraction efficiency (ordinate axis) with respect to the incident angle (abscissa axis) of the axial principal ray of wavelength 520 nm. FIG. 27 is a graph showing the diffraction efficiency (ordinate axis) for the axial principal ray incident at an angle of 47.3° with respect to wavelength (abscissa axis).

It will be understood from FIG. 26 that a high diffraction efficiency, i.e. approximately 100%, can be obtained at an incident angle in the neighborhood of 47.3°. From FIG. 27, it will be understood that a favorable reflection and diffraction efficiency can be obtained in a wavelength range of 520 nm±20 nm. Meanwhile, light rays reflected from the reflecting surface of the first prism member after being reflected and diffracted from the volume hologram surface are incident on the hologram surface again. At this time, the axial principal ray is incident on the hologram surface at an angle of 18.7°. It will be understood from FIG. 26 that the incident angle of 18.7° is not within the angle selectivity range of the volume holographic element, in which it exhibits a high diffraction efficiency, and the diffraction efficiency is as low as about 0%. Therefore, the light rays pass through the volume holographic element as they are.

The above discussion is true of the R band and the B band. It is also possible to use a switching holographic element employing a liquid crystal as the above-described holographic element.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 23(a) is a front view of a portable telephone incorporating an image pickup optical system according to the present invention as an objective optical system.

FIG. 23(b) is a side view of the portable telephone shown in FIG. 23(a).

FIG. 23(c) is a sectional view of a photographic optical system of the portable telephone shown in FIG. 23(a).

DESCRIPTION OF THE PREFERRED EMBODIMENTS

Examples of the viewing optical system and image pickup optical system according to the present invention will be described below.

Figure 1:
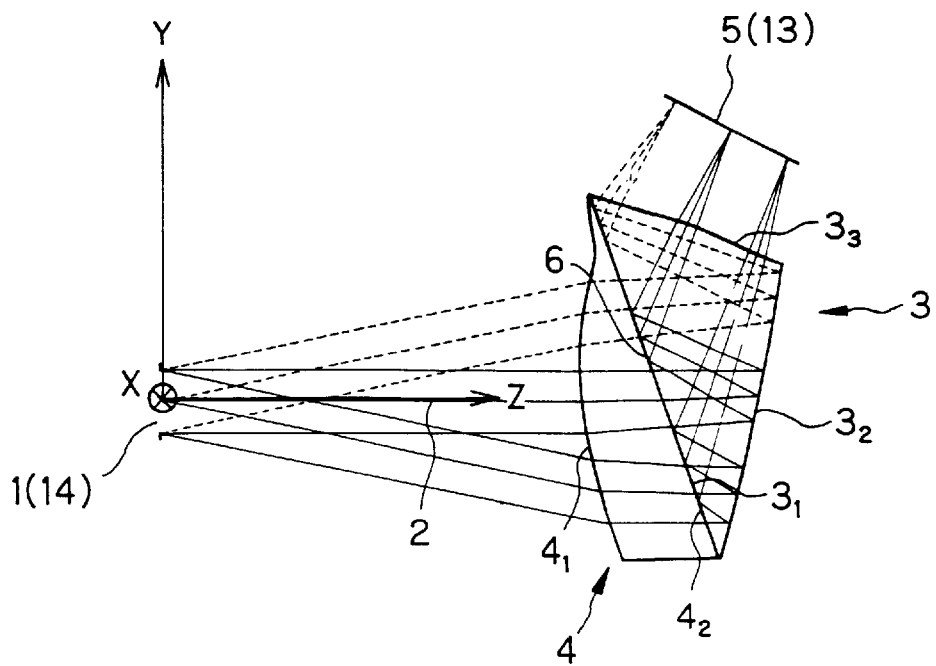
FIG. 1 is a sectional view of an optical system according to Example 1 of the present invention, taken along a YZ-plane containing an optical axis thereof.
Figure 2:
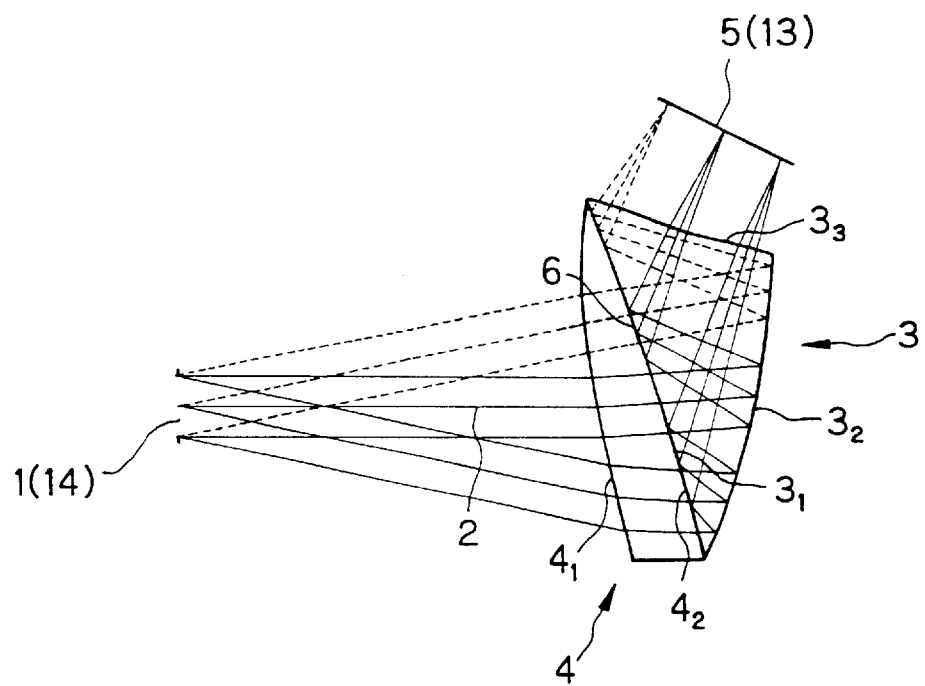
FIG. 2 is a sectional view of an optical system according to Example 2 of the present invention, taken along a YZ-plane containing an optical axis thereof.
Figure 3:
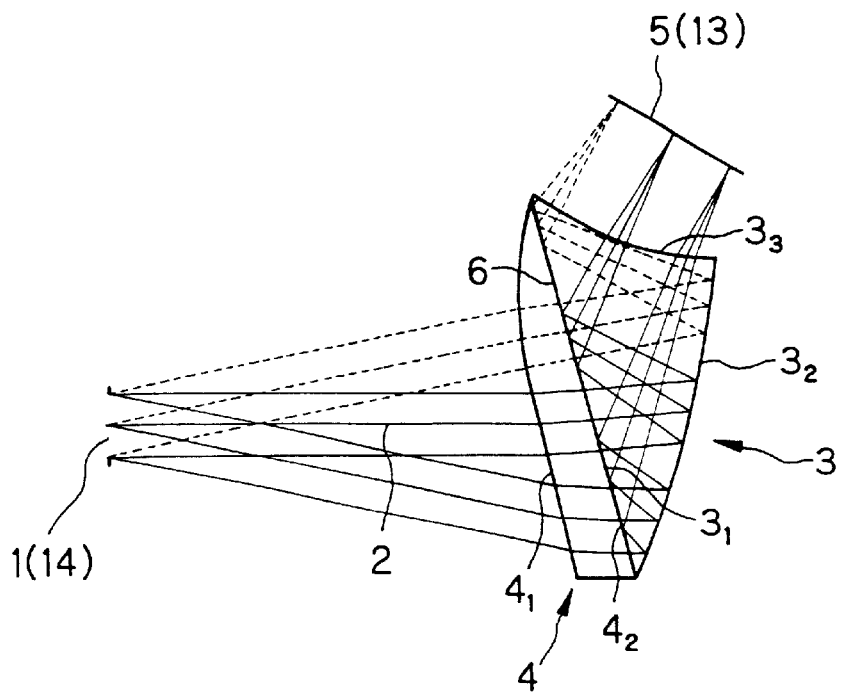
FIG. 3 is a sectional view of an optical system according to Example 3 of the present invention, taken along a YZ-plane containing an optical axis thereof.
Figure 4:
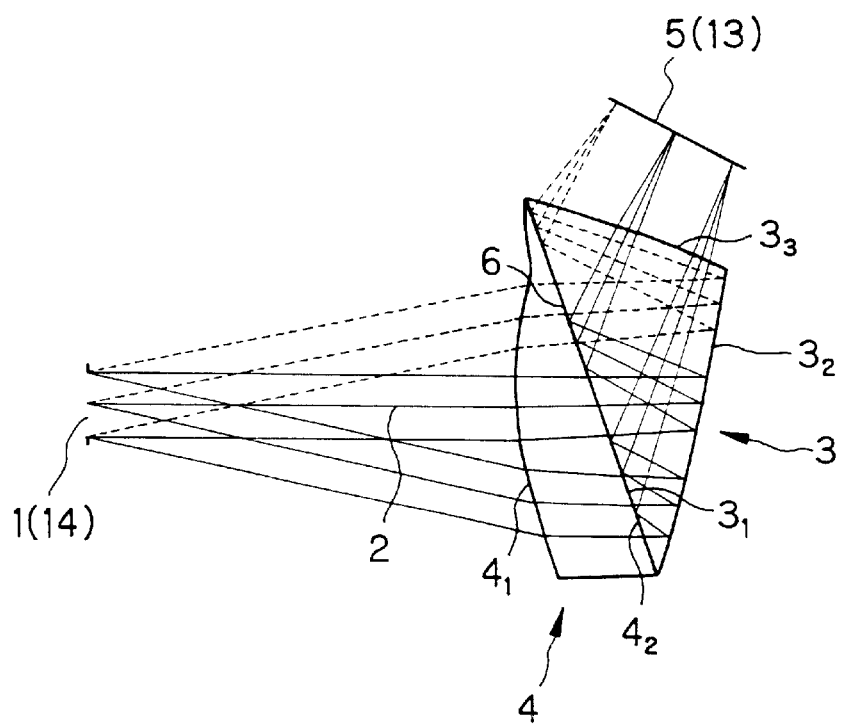
FIG. 4 is a sectional view of an optical system according to Example 4 of the present invention, taken along a YZ-plane containing an optical axis thereof.
Figure 5:
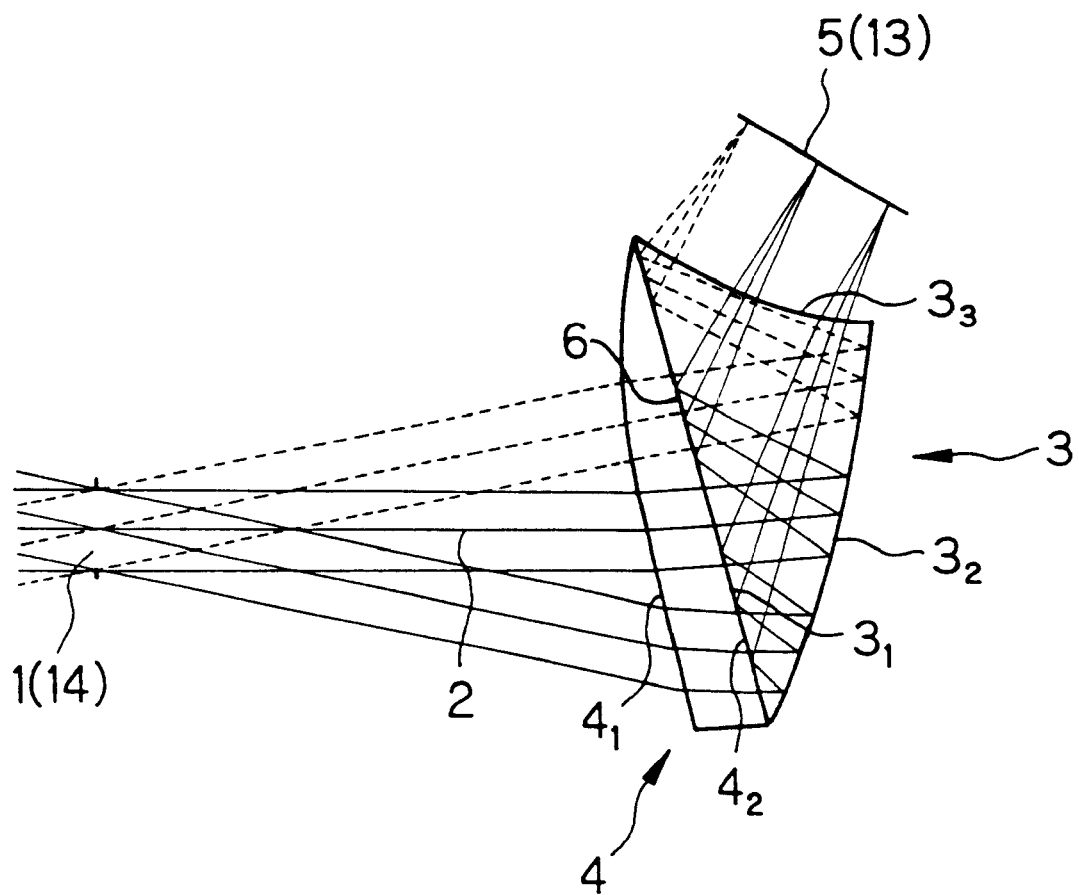
FIG. 5 is a sectional view of an optical system according to Example 5 of the present invention, taken along a YZ-plane containing an optical axis thereof.

It should be noted that constituent parameters of Examples 1 to 5 will be shown later. In each example, as shown in FIG. 1 by way of example, an axial principal ray 2 is defined by a light ray from the center of an exit pupil 1 (or an aperture stop 14; the rolling center of an observer's eyeball) that passes through a second prism member 4 and a first prism member 3 to reach the center of an LCD 5 (or an image pickup device 13) provided as an observation image forming member. An optical axis defined by a straight line along which the axial principal ray 2 travels until it intersects the exit pupil-side surface $4_1$ of the second prism member 4 is defined as a Z-axis. An axis perpendicularly intersecting the Z-axis in the decentration plane of each surface constituting the prism is defined as a Y-axis. An axis perpendicularly intersecting the optical axis (Z-axis) and also perpendicularly intersecting the Y-axis is defined as an X-axis. Further, the center of the exit pupil 1 (or the aperture stop 14) is defined as the origin of the coordinate system. Further, the direction along which the axial principal ray 2 from the exit pupil 1 (or the aperture stop 14) travels to reach the LCD 5 (or the image pickup device 13) is defined as a positive direction of the Z-axis. The direction in which the Y-axis extends toward the LCD 5 (or the image pickup device 13) is defined as a positive direction of the Y-axis. The direction in which the X-axis constitutes a right-handed system in combination with the Y- and Z-axes is defined as a positive direction of the X-axis.

In Examples 1 to 5, the first prism member 3 and the second prism member 4 are decentered in the YZ-plane, and one and only plane of symmetry of each rotationally asymmetric free-form surface provided in the first and second prism members 3 and 4 is the YZ-plane.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the above equation (d) or (e) in the case of toric surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\beta$ counterclockwise about the Y-axis. Then, the center axis of the surface, which has been rotated twice, is rotated through $\gamma$ clockwise about the Z-axis of the new coordinate system.

Among optical functional surfaces constituting the optical system in each of Examples 1 to 5, a specific surface and a surface subsequent thereto are given a surface separation when these surfaces form a coaxial optical system. In addition, the radius of curvature of each spherical surface and the refractive index and Abbe's number of each medium are given according to the conventional method.

The configuration of each free-form surface used in the present invention is defined by the above equation (a). The Z-axis of the defining equation is the axis of the free-form surface.

Free-form surfaces may also be defined by Zernike polynomials. That is, the configuration of a free-form surface may be defined by the following equation (h). The Z-axis of the defining equation (h) is the axis of Zernike polynomial. A rotationally asymmetric surface is defined by polar coordinates of the height of the Z-axis with respect to the XY-plane. In the equation (h), R is the distance from the Z-axis in the XY-plane, and A is the azimuth angle about the Z-axis, which is expressed by the angle of rotation measured from the X-axis.

$$x = R \times \cos(A) \quad \text{(h)}$$

$$y = R \times \sin(A)$$

$$Z = D_2 + D_3 R\cos(A) + D_4 R\sin(A) + D_5 R^2\cos(2A) +$$
$$D_6(R^2 - 1) + D_7 R^2\sin(2A) + D_8 R^3\cos(3A) +$$
$$D_9(3R^3 - 2R)\cos(A) + D_{10}(3R^3 - 2R)\sin(A) +$$
$$D_{11} R^3\sin(3A) + D_{12} R^4\cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4\sin(4A) +$$
$$D_{17} R^5\cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5\sin(5A) +$$
$$D_{23} R^6\cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6\sin(6A)$$

where $D_m$ (m is an integer of 2 or higher) are coefficients. It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

The configuration of a rotationally asymmetric free-form surface can also be defined by the following equation (i). The Z-axis of the defining equation (i) is the axis of the rotationally asymmetric surface.

$$z = \Sigma_n \Sigma_m C_{nm} x^n y^{n-m} \quad \text{(i)}$$

where $\Sigma_n$ indicates that n of $\Sigma$ is from 0 to k, and $\Sigma_m$ indicates that m of $\Sigma$ is from 0 to n.

Although in Examples 1 to 5 of the present invention the surface configuration is expressed by a free-form surface using the above equation (a), it should be noted that the same advantageous effect can be obtained by using the above equation (h) or (i).

Examples 1 to 5 will be described below specifically. In these examples, the present invention will be described as an image display apparatus using a viewing optical system.

FIGS. 1 to 5 are sectional views of viewing optical systems according to Examples 1 to 5 of the present invention, taken along the YZ-plane containing the optical axis. The viewing optical systems of these examples each have an LCD 5 disposed on the image plane side of the optical system as an image forming member for displaying an image to be viewed by an observer and an ocular optical member for leading the observation image formed by the image forming member to an exit pupil 1 formed at the position of an observer's eyeball (pupil plane) to observe the image.

The ocular optical member includes a first prism member 3 and a second prism member 4.

In the description of each example, the surface Nos. of the optical system are put in the order of tracing (backward ray tracing) from the exit pupil 1 toward the LCD 5, as a general rule, and the surfaces of the first and second prism members 3 and 4 are also shown by ordinal numbers in the backward ray tracing. Further, a light beam traveling along an optical path connecting the exit pupil 1 and the LCD 5 through the optical system is referred to as "the first light beam".

The first prism member 3 has a first entrance surface $3_3$, a reflecting surface $3_2$, and a first exit surface $3_1$, which are disposed to face each other across a transparent prism medium, e.g. a glass or plastic material.

The second prism member 4 has a second entrance surface $4_2$ and a second exit surface $4_1$, which are disposed to face each other across a transparent prism medium, e.g. a glass or plastic material.

The first prism member 3 and the second prism member 4 are cemented together with a reflection type volume hologram (HOE) 6 interposed therebetween as a holographic element.

It should be noted that the prism medium of the first prism member 3 and the prism medium of the second prism member 4 are the same medium, i.e. the same glass material or the same plastic material.

In all Examples 1 to 5, the first entrance surface $3_3$ of the first prism member 3 is disposed on the side of the first prism member 3 closer to the LCD 5 to transmit light rays from the observation image so that the light rays enter the first prism member 3. The first entrance surface $3_3$ is a free-form surface having only one plane of symmetry that gives a power to light rays when they pass through the surface.

The reflecting surface $3_2$ reflects light rays within the first prism member 3. In all Examples 1 to 5, the reflecting surface $3_2$ is a concave surface (a free-form surface in the examples) that gives a positive power to the light rays when reflecting them. The reflecting surface $3_2$ is provided with mirror coating.

The first exit surface $3_1$ is a surface through which light rays exit the first prism member 3. In Example 1, the first exit surface $3_1$ is a cylindrical surface having a curvature in the X-axis direction but no curvature in the Y-axis direction. In Example 2, the first exit surface $3_1$ is a cylindrical surface having a curvature in the Y-axis direction but no curvature in the X-axis direction. In Example 3, the first exit surface $3_1$ is a plane surface. In Example 4, the first exit surface $3_1$ is a toric surface having different curvatures in the X- and Y-axis directions. In Example 5, the first exit surface $3_1$ is a spherical surface.

The second entrance surface $4_2$ of the second prism member 4 is disposed on the side of the second prism member 4 closer to the first prism member 3 to transmit the light rays exiting from the first prism member 3 so that the light rays enter the second prism member 4. In all Examples 1 to 5, the second entrance surface $4_2$ has approximately the same surface configuration as that of the first exit surface $3_1$ of the first prism member 3.

The second exit surface $4_1$ is a surface through which the light rays exit the second prism member 4. In all Examples 1 to 5, the second exit surface $4_1$ is a free-form surface having only one plane of symmetry that gives a power to light rays when they pass through the surface. The second exit surface $4_1$ corrects at least either one of rotationally asymmetric coma and astigmatism produced in the ocular optical member.

It should be noted that the one and only plane of symmetry of the free-form surfaces constituting the first entrance surface $3_3$ and the reflecting surface $3_2$ of the first prism member 3 and the second exit surface $4_1$ of the second prism member 4 is coincident with a plane (YZ-plane) in which the optical axis is folded (see FIGS. 1 to 5).

As has been stated above, the volume hologram 6 is arranged so that when the first light beam is incident thereon at a first incident angle (e.g. 47.3° for light rays of wavelength 520 nm in Example 1), the volume hologram 6 diffracts and reflects the incident light beam, whereas when the first light beam is incident thereon at an angle other than the first incident angle, the volume hologram 6 transmits the incident light beam.

In the viewing optical systems in Examples 1 to 5, the first light beam emitted from the LCD 5 enters the first prism member 3 through the first entrance surface 3₃. Thereafter, the first light beam is incident at the first incident angle on the volume hologram 6 bonded to the first exit surface 3₁. At this time, the first light beam is diffracted and reflected toward the reflecting surface 3₂ by the volume hologram 6 at a reflection diffraction efficiency close to 100%. The first light beam is reflected by the reflecting surface 3₂ and incident at an angle other than the first incident angle on the volume hologram 6 bonded to the first exit surface 3₁. The incident angle at this time is not within the diffraction efficiency angle selectivity range of the volume hologram 6, in which it exhibits a high diffraction efficiency. Therefore, the incident first light beam passes through the volume hologram 6 and thus exits the first prism member 3. Thereafter, the first light beam enters the second prism member 4 through the second entrance surface 4₂ of the second prism member 4 and passes through the second exit surface 4₁ to exit the second prism member 4. Then, the first light beam is led to the exit pupil 1.

Although the present invention is described as a viewing optical system in Examples 1 to 5, it should be noted that the present invention can be constructed in the form of an image pickup optical system by disposing an image pickup device 13 in the image plane of the viewing optical system in place of the LCD 5 and placing an aperture stop 14 in the pupil plane (i.e. at the position of the exit pupil 1) to reduce the brightness of a light beam from the object.

In that case, the first entrance surface 3₃ of the first prism member 3 acts as a surface (fourth exit surface) through which light rays exit the first prism member 3. The first exit surface 3₁ of the first prism member 3 acts as a surface (fourth entrance surface) through which light rays exiting from the second prism member 4 enter the first prism member 3. The second entrance surface 4₂ of the second prism member 4 acts as a surface (third exit surface) through which light rays exit the second prism member 4. The second exit surface 4₁ of the second prism member 4 acts as a surface (third entrance surface) through which light rays emanating from the object and passing through the aperture stop 14 enter the second prism member 4.

In a case where the present invention is constructed in the form of an image pickup optical system, light rays emanating from the object and passing through the aperture stop 14 enter the second prism member 4 through the third entrance surface 4₁. Thereafter, the light rays are incident at an angle other than the first incident angle on the volume hologram 6 bonded to the third exit surface 4₂ of the second prism member 4. The incident angle at this time is not within the diffraction efficiency angle selectivity range of the volume hologram 6, in which it exhibits a high diffraction efficiency. Therefore, the incident first light beam passes through the volume hologram 6 and thus exits the second prism member 4. Then, the first light beam enters the first prism member 3 through the fourth entrance surface 3₁ of the first prism member 3. Thereafter, the first light beam is reflected by the reflecting surface 3₂ of the first prism member 3 and incident at an angle approximately equal to the first incident angle (e.g. 47.3° for light rays of wavelength 520 nm in Example 1) on the volume hologram 6 bonded to the fourth entrance surface 3₁. The incident first light beam is diffracted and reflected by the volume hologram 6 at a reflection and diffraction efficiency close to 100% and passes through the fourth exit surface 3₃ to exit the first prism member 3. Then, the first light beam is led to the image pickup device 13.

In addition, the volume hologram 6 is formed by bonding together three layers of R, G and B so that a color image can be observed.

In all Examples 1 to 5, the image display device used therein has a diagonal length of 0.55 inches and an aspect ratio of 4:3. The size of the image display device is 8.448 mm×11.264 mm in length and breadth. The central diopter is −1.0 D. Regarding the viewing field angles, the horizontal full field angle is 30.0°, and the vertical full field angle is 22.7°. The pupil diameter is 4 mm. The eye relief is 28.34 mm in Example 1, 27.93 mm in Example 2, 27.91 mm in Example 3, 28.34 mm in Example 4, and 27.95 mm in Example 5.

Numerical data in each example is as follows. In the tables below, "FFS" denotes a free-form surface, "CYL" denotes a cylindrical surface, "HOE" denotes a reflection hologram surface, "TOR" denotes a toric surface, and "RE" denotes a reflecting surface.

EXAMPLE 1

| Surface No. Object plane | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | (1) | | |
| 2 | FFS① | | (2) | 1.5254 | 56.2 |
| 3 | CYL① | | (3) | 1.5254 | 56.2 |
| 4 | FFS② (RE) | | (4) | 1.5254 | 56.2 |
| 5 | CYL① (HOE①) | | (3) | 1.5254 | 56.2 |
| 6 | FFS③ | | (5) | | |
| Image plane | ∞ | | (6) | | |

CYL①
Rx −183.88
Ry ∞

FFS①
$C_4$  $1.4081 \times 10^{-2}$  $C_6$  $1.9480 \times 10^{-2}$  $C_8$  $5.7152 \times 10^{-4}$
$C_{10}$  $3.1468 \times 10^{-4}$  $C_{11}$  $-9.0005 \times 10^{-6}$  $C_{13}$  $-5.2999 \times 10^{-5}$
$C_{15}$  $-2.0707 \times 10^{-5}$ FFS②
$C_4$  $-6.6649 \times 10^{-3}$  $C_6$  $-3.7544 \times 10^{-3}$  $C_8$  $1.2394 \times 10^{-4}$
$C_{10}$  $2.2242 \times 10^{-5}$  $C_{11}$  $-3.2898 \times 10^{-6}$  $C_{13}$  $-1.4789 \times 10^{-5}$
$C_{15}$  $-5.7270 \times 10^{-6}$ FFS③
$C_4$  $-5.5913 \times 10^{-3}$  $C_6$  $-1.1475 \times 10^{-2}$  $C_8$  $-6.6952 \times 10^{-4}$
$C_{10}$  $6.7339 \times 10^{-5}$  $C_{11}$  $9.2151 \times 10^{-5}$  $C_{13}$  $3.7627 \times 10^{-4}$
$C_{15}$  $1.5673 \times 10^{-4}$ HOE①
HV1: REA    HV2: REA    HOR: 1
HX1: 0.0    HY1: 0.0    HZ1: 0.0
HX2: 0.0    HY2: 0.0    HZ2: 0.0
(First Layer)

HWL: 630
$H_2$  $0.1033 \times 10^{-2}$  $H_3$  $-0.2160 \times 10^{-2}$  $H_5$  $-0.1062 \times 10^{-2}$
$H_7$  $-0.1201 \times 10^{-3}$  $H_9$  $-0.3320 \times 10^{-4}$  $H_{10}$  $0.6054 \times 10^{-5}$
$H_{12}$  $-0.6586 \times 10^{-6}$  $H_{14}$  $-0.2407 \times 10^{-6}$  $H_{16}$  $0.5397 \times 10^{-6}$
$H_{18}$  $0.5652 \times 10^{-8}$  $H_{20}$  $-0.1139 \times 10^{-7}$  $H_{21}$  $-0.9545 \times 10^{-8}$
$H_{23}$  $0.2587 \times 10^{-7}$  $H_{25}$  $-0.2341 \times 10^{-8}$  $H_{27}$  $0.5905 \times 10^{-10}$
(Second Layer)

HWL: 520
$H_2$  $0.7285 \times 10^{-3}$  $H_3$  $-0.1900 \times 10^{-2}$  $H_5$  $-0.9272 \times 10^{-3}$
$H_7$  $-0.1079 \times 10^{-3}$  $H_9$  $-0.3038 \times 10^{-4}$  $H_{10}$  $0.5751 \times 10^{-5}$
$H_{12}$  $-0.1250 \times 10^{-5}$  $H_{14}$  $-0.8794 \times 10^{-7}$  $H_{16}$  $0.5433 \times 10^{-6}$
$H_{18}$  $-0.2290 \times 10^{-7}$  $H_{20}$  $0.3096 \times 10^{-7}$  $H_{21}$  $-0.9701 \times 10^{-8}$
$H_{23}$  $0.2835 \times 10^{-7}$  $H_{25}$  $-0.2596 \times 10^{-8}$  $H_{27}$  $0.1819 \times 10^{-8}$
(Third Layer)

HWL: 470
$H_2$  $0.4134 \times 10^{-3}$  $H_3$  $-0.1746 \times 10^{-2}$  $H_5$  $-0.8496 \times 10^{-3}$
$H_7$  $-0.1006 \times 10^{-3}$  $H_9$  $-0.2702 \times 10^{-4}$  $H_{10}$  $0.5553 \times 10^{-5}$
$H_{12}$  $-0.1524 \times 10^{-5}$  $H_{14}$  $0.7510 \times 10^{-7}$  $H_{16}$  $0.5495 \times 10^{-6}$
$H_{18}$  $-0.4000 \times 10^{-7}$  $H_{20}$  $0.5038 \times 10^{-7}$  $H_{21}$  $-0.9397 \times 10^{-8}$
$H_{23}$  $0.2966 \times 10^{-7}$  $H_{25}$  $-0.2949 \times 10^{-8}$  $H_{27}$  $0.2580 \times 10^{-8}$

EXAMPLE 1-continued

| Surface No. Object plane | Radius of curvature ∞ | Surface separation −1000.00 | Displacement and tilt | Refractive index | Abbe's No. |
|---|---|---|---|---|---|

Displacement and tilt (1)

| | | | | | |
|---|---|---|---|---|---|
| X | 0.00 | Y | 0.00 | Z | 0.00 |
| α | 0.00 | β | 0.00 | γ | 0.00 |

Displacement and tilt (2)

| X | 0.00 | Y | −2.67 | Z | 28.34 |
|---|---|---|---|---|---|
| α | 10.37 | β | 0.00 | γ | 0.00 |

Displacement and tilt (3)

| X | 0.00 | Y | 4.54 | Z | 31.74 |
|---|---|---|---|---|---|
| α | 20.14 | β | 0.00 | γ | 0.00 |

Displacement and tilt (4)

| X | 0.00 | Y | −1.47 | Z | 39.62 |
|---|---|---|---|---|---|
| α | −12.73 | β | 0.00 | γ | 0.00 |

Displacement and tilt (5)

| X | 0.00 | Y | 11.09 | Z | 35.79 |
|---|---|---|---|---|---|
| α | 69.79 | β | 0.00 | γ | 0.00 |

Displacement and tilt (6)

| X | 0.00 | Y | 17.48 | Z | 38.23 |
|---|---|---|---|---|---|
| α | −116.96 | β | 0.00 | γ | 0.00 |

$\theta = 69.86°$
$Dx/Rx = -0.0613$
$Dx/Ry = 0$
$Da/Ra = -0.0944$
$Db/Rb = 0$

EXAMPLE 2

| Surface No. Object plane | Radius of curvature ∞ | Surface separation −1000.00 | Displacement and tilt | Refractive index | Abbe's No. |
|---|---|---|---|---|---|
| 1 | ∞ (Pupil) | | (1) | | |
| 2 | FFS① | | (2) | 1.5254 | 56.2 |
| 3 | CYL① | | (3) | 1.5254 | 56.2 |
| 4 | FFS② (RE) | | (4) | 1.5254 | 56.2 |
| 5 | CYL① (HOE①) | | (3) | 1.5254 | 56.2 |
| 6 | FFS③ | | (5) | | |
| Image plane | ∞ | | (6) | | |

CYL①
Rx ∞
Ry −167.81

FFS①
$C_4$ $3.2852 \times 10^{-2}$   $C_6$ $3.2975 \times 10^{-3}$   $C_8$ $3.1981 \times 10^{-4}$
$C_{10}$ $4.3918 \times 10^{-4}$   $C_{11}$ $-1.4812 \times 10^{-5}$   $C_{13}$ $-5.4025 \times 10^{-5}$
$C_{15}$ $3.8057 \times 10^{-5}$ FFS②
$C_4$ $-6.4069 \times 10^{-4}$   $C_6$ $-1.0330 \times 10^{-2}$   $C_8$ $1.8977 \times 10^{-4}$
$C_{10}$ $4.5314 \times 10^{-5}$   $C_{11}$ $-7.0230 \times 10^{-6}$   $C_{13}$ $-1.6251 \times 10^{-5}$
$C_{15}$ $4.6406 \times 10^{-6}$ FFS③
$C_4$ $-1.5137 \times 10^{-2}$   $C_6$ $1.6463 \times 10^{-2}$   $C_8$ $-2.4620 \times 10^{-3}$
$C_{10}$ $1.8240 \times 10^{-4}$   $C_{11}$ $1.5732 \times 10^{-4}$   $C_{13}$ $3.2072 \times 10^{-4}$
$C_{15}$ $-2.8944 \times 10^{-4}$ HOE①
HV1: REA   HV2: REA   HOR: 1
HX1: 0.0   HY1: 0.0   HZ1: 0.0
HX2: 0.0   HY2: 0.0   HZ2: 0.0

(First Layer)

HWL: 630
$H_2$ $0.5585 \times 10^{-2}$   $H_3$ $-0.2727 \times 10^{-2}$   $H_5$ $-0.2241 \times 10^{-3}$
$H_7$ $-0.1729 \times 10^{-3}$   $H_9$ $0.2012 \times 10^{-4}$   $H_{10}$ $0.4093 \times 10^{-5}$
$H_{12}$ $-0.6315 \times 10^{-6}$   $H_{14}$ $0.4235 \times 10^{-6}$   $H_{16}$ $0.4673 \times 10^{-6}$

EXAMPLE 2-continued

| Surface No. Object plane | Radius of curvature ∞ | Surface separation −1000.00 | Displacement and tilt | Refractive index | Abbe's No. |
|---|---|---|---|---|---|

$H_{18}$ $0.4414 \times 10^{-6}$   $H_{20}$ $-0.3938 \times 10^{-6}$   $H_{21}$ $-0.1230 \times 10^{-7}$
$H_{23}$ $0.3303 \times 10^{-7}$   $H_{25}$ $-0.7171 \times 10^{-9}$   $H_{27}$ $-0.1609 \times 10^{-7}$ (Second Layer)

HWL: 520
$H_2$ $0.4590 \times 10^{-2}$   $H_3$ $-0.2294 \times 10^{-2}$   $H_5$ $-0.9272 \times 10^{-3}$
$H_7$ $-0.1573 \times 10^{-3}$   $H_9$ $0.2531 \times 10^{-4}$   $H_{10}$ $0.5751 \times 10^{-5}$
$H_{12}$ $-0.9114 \times 10^{-6}$   $H_{14}$ $0.1040 \times 10^{-5}$   $H_{16}$ $0.5433 \times 10^{-6}$
$H_{18}$ $0.3726 \times 10^{-6}$   $H_{20}$ $-0.3844 \times 10^{-6}$   $H_{21}$ $-0.9701 \times 10^{-8}$
$H_{23}$ $0.3090 \times 10^{-7}$   $H_{25}$ $0.1526 \times 10^{-9}$   $H_{27}$ $0.1819 \times 10^{-8}$ (Third Layer)

HWL: 470
$H_2$ $0.3871 \times 10^{-2}$   $H_3$ $-0.2031 \times 10^{-2}$   $H_5$ $-0.2192 \times 10^{-3}$
$H_7$ $-0.1416 \times 10^{-3}$   $H_9$ $0.2737 \times 10^{-4}$   $H_{10}$ $0.2333 \times 10^{-5}$
$H_{12}$ $-0.5933 \times 10^{-6}$   $H_{14}$ $0.1284 \times 10^{-5}$   $H_{16}$ $0.4896 \times 10^{-6}$
$H_{18}$ $0.3413 \times 10^{-6}$   $H_{20}$ $-0.3722 \times 10^{-6}$   $H_{21}$ $-0.3603 \times 10^{-8}$
$H_{23}$ $0.2860 \times 10^{-7}$   $H_{25}$ $-0.1499 \times 10^{-8}$   $H_{27}$ $-0.1747 \times 10^{-7}$ Displacement and tilt (1)

| X | 0.00 | Y | 0.00 | Z | 0.00 |
|---|---|---|---|---|---|
| α | 0.00 | β | 0.00 | γ | 0.00 |

Displacement and tilt (2)

| X | 0.00 | Y | 0.36 | Z | 27.93 |
|---|---|---|---|---|---|
| α | 11.25 | β | 0.00 | γ | 0.00 |

Displacement and tilt (3)

| X | 0.00 | Y | 3.67 | Z | 30.94 |
|---|---|---|---|---|---|
| α | 19.56 | β | 0.00 | γ | 0.00 |

Displacement and tilt (4)

| X | 0.00 | Y | −0.62 | Z | 38.24 |
|---|---|---|---|---|---|
| α | −13.13 | β | 0.00 | γ | 0.00 |

Displacement and tilt (5)

| X | 0.00 | Y | 11.01 | Z | 34.91 |
|---|---|---|---|---|---|
| α | 75.07 | β | 0.00 | γ | 0.00 |

Displacement and tilt (6)

| X | 0.00 | Y | 17.90 | Z | 36.47 |
|---|---|---|---|---|---|
| α | −115.50 | β | 0.00 | γ | 0.00 |

$\theta = 70.03°$
$Dx/Rx = 0$
$Dx/Ry = -0.0707$
$Da/Ra = -0.1282$
$Db/Rb = 0$

EXAMPLE 3

| Surface No. Object plane | Radius of curvature ∞ | Surface separation −1000.00 | Displacement and tilt | Refractive index | Abbe's No. |
|---|---|---|---|---|---|
| 1 | ∞ (Pupil) | | (1) | | |
| 2 | FFS① | | (2) | 1.5254 | 56.2 |
| 3 | ∞ | | (3) | 1.5254 | 56.2 |
| 4 | FFS② (RE) | | (4) | 1.5254 | 56.2 |
| 5 | ∞ (HOE①) | | (3) | 1.5254 | 56.2 |
| 6 | FFS③ | | (5) | | |
| Image plane | ∞ | | (6) | | |

FFS①
$C_4$ $3.3501 \times 10^{-2}$   $C_6$ $2.9604 \times 10^{-3}$   $C_8$ $5.7973 \times 10^{-4}$
$C_{10}$ $6.6754 \times 10^{-4}$   $C_{11}$ $-9.2202 \times 10^{-6}$   $C_{13}$ $-5.0913 \times 10^{-5}$
$C_{15}$ $3.4518 \times 10^{-5}$ FFS②
$C_4$ $-2.5765 \times 10^{-4}$   $C_6$ $-8.8917 \times 10^{-3}$   $C_8$ $2.4647 \times 10^{-4}$
$C_{10}$ $3.8827 \times 10^{-5}$   $C_{11}$ $-6.6413 \times 10^{-6}$   $C_{13}$ $-1.3699 \times 10^{-5}$

EXAMPLE 3-continued

| Surface No. Object plane | Radius of curvature ∞ | Surface separation −1000.00 | Displacement and tilt | Refractive index | Abbe's No. |
|---|---|---|---|---|---|

$C_{15}$  $6.8648 \times 10^{-6}$
FFS③
$C_4$  $-9.5889 \times 10^{-3}$  $C_6$  $3.3124 \times 10^{-2}$  $C_8$  $-3.5119 \times 10^{-3}$
$C_{10}$  $1.7859 \times 10^{-3}$  $C_{11}$  $1.6079 \times 10^{-4}$  $C_{13}$  $3.2884 \times 10^{-5}$
$C_{15}$  $-3.2974 \times 10^{-4}$
HOE①

| HV1: REA | HV2: REA | HOR: | 1 |
|---|---|---|---|
| HX1: 0.0 | HY1: 0.0 | HZ1: | 0.0 |
| HX2: 0.0 | HY2: 0.0 | HZ2: | 0.0 |

(First Layer)

HWL: 630
$H_2$  $0.5015 \times 10^{-2}$  $H_3$  $-0.2727 \times 10^{-2}$  $H_5$  $-0.6845 \times 10^{-4}$
$H_7$  $-0.1253 \times 10^{-3}$  $H_9$  $0.2997 \times 10^{-4}$  $H_{10}$  $0.5917 \times 10^{-5}$
$H_{12}$  $-0.9083 \times 10^{-6}$  $H_{14}$  $0.1669 \times 10^{-5}$  $H_{16}$  $0.3649 \times 10^{-6}$
$H_{18}$  $-0.5739 \times 10^{-7}$  $H_{20}$  $-0.1921 \times 10^{-6}$  $H_{21}$  $-0.1067 \times 10^{-7}$
$H_{23}$  $0.1352 \times 10^{-7}$  $H_{25}$  $-0.1290 \times 10^{-7}$  $H_{27}$  $-0.8941 \times 10^{-8}$ (Second Layer)

HWL: 520
$H_2$  $0.4085 \times 10^{-2}$  $H_3$  $-0.2327 \times 10^{-2}$  $H_5$  $-0.9226 \times 10^{-4}$
$H_7$  $-0.1099 \times 10^{-3}$  $H_9$  $0.2933 \times 10^{-4}$  $H_{10}$  $0.4942 \times 10^{-5}$
$H_{12}$  $-0.8760 \times 10^{-6}$  $H_{14}$  $0.1990 \times 10^{-5}$  $H_{16}$  $0.4349 \times 10^{-6}$
$H_{18}$  $-0.9260 \times 10^{-7}$  $H_{20}$  $-0.1725 \times 10^{-6}$  $H_{21}$  $-0.5201 \times 10^{-8}$
$H_{23}$  $0.1461 \times 10^{-7}$  $H_{25}$  $-0.1144 \times 10^{-7}$  $H_{27}$  $-0.1007 \times 10^{-7}$ (Third Layer)

HWL: 470
$H_2$  $0.3396 \times 10^{-2}$  $H_3$  $-0.2090 \times 10^{-2}$  $H_5$  $-0.1106 \times 10^{-3}$
$H_7$  $-0.9409 \times 10^{-4}$  $H_9$  $0.2936 \times 10^{-4}$  $H_{10}$  $0.4540 \times 10^{-5}$
$H_{12}$  $-0.4906 \times 10^{-6}$  $H_{14}$  $0.2100 \times 10^{-5}$  $H_{16}$  $0.4005 \times 10^{-6}$
$H_{18}$  $-0.1097 \times 10^{-6}$  $H_{20}$  $-0.1643 \times 10^{-6}$  $H_{21}$  $-0.4518 \times 10^{-8}$
$H_{23}$  $0.1283 \times 10^{-7}$  $H_{25}$  $-0.1245 \times 10^{-7}$  $H_{27}$  $-0.9771 \times 10^{-8}$ Displacement and tilt (1)

| X | 0.00 | Y | 0.00 | Z | 0.00 |
|---|---|---|---|---|---|
| α | 0.00 | β | 0.00 | γ | 0.00 |

Displacement and tilt (2)

| X | 0.00 | Y | 0.37 | Z | 27.91 |
|---|---|---|---|---|---|
| α | 13.67 | β | 0.00 | γ | 0.00 |

Displacement and tilt (3)

| X | 0.00 | Y | 2.73 | Z | 30.67 |
|---|---|---|---|---|---|
| α | 16.01 | β | 0.00 | γ | 0.00 |

Displacement and tilt (4)

| X | 0.00 | Y | 0.09 | Z | 37.63 |
|---|---|---|---|---|---|
| α | −13.84 | β | 0.00 | γ | 0.00 |

Displacement and tilt (5)

| X | 0.00 | Y | 10.95 | Z | 35.87 |
|---|---|---|---|---|---|
| α | 80.36 | β | 0.00 | γ | 0.00 |

Displacement and tilt (6)

| X | 0.00 | Y | 18.32 | Z | 36.73 |
|---|---|---|---|---|---|
| α | −119.42 | β | 0.00 | γ | 0.00 |

θ = 73.99°
Dx/Rx = 0
Dx/Ry = 0
Da/Ra = 0
Db/Rb = 0

EXAMPLE 4

| Surface No. Object plane | Radius of curvature ∞ | Surface separation −1000.00 | Displacement and tilt | Refractive index | Abbe's No. |
|---|---|---|---|---|---|
| 1 | ∞ (Pupil) | | (1) | | |
| 2 | FFS① | | (2) | 1.5254 | 56.2 |
| 3 | TOR① | | (3) | 1.5254 | 56.2 |
| 4 | FFS② (RE) | | (4) | 1.5254 | 56.2 |
| 5 | TOR① (HOE①) | | (3) | 1.5254 | 56.2 |
| 6 | FFS③ | | (5) | | |
| Image plane | ∞ | | (6) | | |

TOR①
Rx  −186.67
Ry  −1921.54

FFS①
$C_4$  $1.4572 \times 10^{-2}$  $C_6$  $1.9424 \times 10^{-2}$  $C_8$  $5.6118 \times 10^{-4}$
$C_{10}$  $3.0191 \times 10^{-4}$  $C_{11}$  $-5.5671 \times 10^{-6}$  $C_{13}$  $-5.7474 \times 10^{-5}$
$C_{15}$  $-2.0993 \times 10^{-5}$ FFS②
$C_4$  $-6.5615 \times 10^{-3}$  $C_6$  $-3.9808 \times 10^{-3}$  $C_8$  $1.1615 \times 10^{-4}$
$C_{10}$  $2.5034 \times 10^{-5}$  $C_{11}$  $-2.4825 \times 10^{-6}$  $C_{13}$  $-1.5860 \times 10^{-5}$
$C_{15}$  $-5.8682 \times 10^{-6}$ FFS③
$C_4$  $-5.3015 \times 10^{-3}$  $C_6$  $-1.2565 \times 10^{-2}$  $C_8$  $-6.6936 \times 10^{-4}$
$C_{10}$  $1.0147 \times 10^{-5}$  $C_{11}$  $8.2407 \times 10^{-5}$  $C_{13}$  $3.9328 \times 10^{-4}$
$C_{15}$  $1.7057 \times 10^{-4}$

HOE①

| HV1: REA | HV2: REA | HOR: | 1 |
|---|---|---|---|
| HX1: 0.0 | HY1: 0.0 | HZ1: | 0.0 |
| HX2: 0.0 | HY2: 0.0 | HZ2: | 0.0 |

(First Layer)

HWL: 630
$H_2$  $0.1210 \times 10^{-2}$  $H_3$  $-0.2183 \times 10^{-2}$  $H_5$  $-0.1060 \times 10^{-2}$
$H_7$  $-0.1201 \times 10^{-3}$  $H_9$  $-0.3374 \times 10^{-4}$  $H_{10}$  $0.5781 \times 10^{-5}$
$H_{12}$  $-0.5260 \times 10^{-6}$  $H_{14}$  $-0.2197 \times 10^{-6}$  $H_{16}$  $0.5362 \times 10^{-6}$
$H_{18}$  $0.1622 \times 10^{-7}$  $H_{20}$  $-0.1139 \times 10^{-7}$  $H_{21}$  $-0.8656 \times 10^{-8}$
$H_{23}$  $0.2598 \times 10^{-7}$  $H_{25}$  $-0.2152 \times 10^{-8}$  $H_{27}$  $0.1856 \times 10^{-10}$ (Second Layer)

HWL: 520
$H_2$  $0.8868 \times 10^{-3}$  $H_3$  $-0.1923 \times 10^{-2}$  $H_5$  $-0.9251 \times 10^{-3}$
$H_7$  $-0.1079 \times 10^{-3}$  $H_9$  $-0.3086 \times 10^{-4}$  $H_{10}$  $0.5549 \times 10^{-5}$
$H_{12}$  $-0.1148 \times 10^{-5}$  $H_{14}$  $-0.7706 \times 10^{-7}$  $H_{16}$  $0.5434 \times 10^{-6}$
$H_{18}$  $-0.1750 \times 10^{-7}$  $H_{20}$  $0.3104 \times 10^{-7}$  $H_{21}$  $-0.8797 \times 10^{-8}$
$H_{23}$  $0.2840 \times 10^{-7}$  $H_{25}$  $-0.2596 \times 10^{-8}$  $H_{27}$  $0.1818 \times 10^{-8}$ (Third Layer)

HWL: 470
$H_2$  $0.5610 \times 10^{-3}$  $H_3$  $-0.1773 \times 10^{-2}$  $H_5$  $-0.8460 \times 10^{-3}$
$H_7$  $-0.1003 \times 10^{-3}$  $H_9$  $-0.2778 \times 10^{-4}$  $H_{10}$  $0.5545 \times 10^{-5}$
$H_{12}$  $-0.1523 \times 10^{-5}$  $H_{14}$  $0.7890 \times 10^{-7}$  $H_{16}$  $0.5497 \times 10^{-6}$
$H_{18}$  $-0.3994 \times 10^{-7}$  $H_{20}$  $0.5314 \times 10^{-7}$  $H_{21}$  $-0.9383 \times 10^{-8}$
$H_{23}$  $0.2987 \times 10^{-7}$  $H_{25}$  $-0.2959 \times 10^{-8}$  $H_{27}$  $0.2687 \times 10^{-8}$ Displacement and tilt (1)

| X | 0.00 | Y | 0.00 | Z | 0.00 |
|---|---|---|---|---|---|
| α | 0.00 | β | 0.00 | γ | 0.00 |

Displacement and tilt (2)

| X | 0.00 | Y | −2.59 | Z | 28.33 |
|---|---|---|---|---|---|
| α | 10.27 | β | 0.00 | γ | 0.00 |

Displacement and tilt (3)

| X | 0.00 | Y | 4.53 | Z | 31.72 |
|---|---|---|---|---|---|
| α | 20.19 | β | 0.00 | γ | 0.00 |

Displacement and tilt (4)

| X | 0.00 | Y | −1.38 | Z | 39.58 |
|---|---|---|---|---|---|
| α | −12.78 | β | 0.00 | γ | 0.00 |

Displacement and tilt (5)

| X | 0.00 | Y | 11.08 | Z | 35.82 |
|---|---|---|---|---|---|
| α | 69.78 | β | 0.00 | γ | 0.00 |

EXAMPLE 4-continued

| Surface No. Object plane | Radius of curvature | Surface separation | Displacement and tilt | Refractive index | Abbe's No. |
|---|---|---|---|---|---|
| | ∞ | −1000.00 | | | |
| Displacement and tilt (6) | | | | | |
| X | 0.00 | Y | 17.48 | Z | 38.14 |
| α | −116.76 | β | 0.00 | γ | 0.00 |

θ = 69.83°
Dx/Rx = −0.0603
Dx/Ry −0.0059
Da/Ra = −0.0928
Db/Rb = −0.0112

EXAMPLE 5

| Surface No. Object plane | Radius of curvature | Surface separation | Displacement and tilt | Refractive index | Abbe's No. |
|---|---|---|---|---|---|
| | ∞ | −1000.00 | | | |
| 1 | ∞ (Pupil) | | (1) | | |
| 2 | FFS① | | (2) | 1.5254 | 56.2 |
| 3 | −2000 | | (3) | 1.5254 | 56.2 |
| 4 | FFS② (RE) | | (4) | 1.5254 | 56.2 |
| 5 | −2000 (HOE①) | | (3) | 1.5254 | 56.2 |
| 6 | FFS③ | | (5) | | |
| Image plane | ∞ | | (6) | | |

FFS①
$C_4$  3.2480 × 10⁻²  $C_6$  2.9376 × 10⁻³  $C_8$  6.3684 × 10⁻⁴
$C_{10}$  6.6437 × 10⁻⁴  $C_{11}$  −1.1018 × 10⁻⁵  $C_{13}$  −4.7966 × 10⁻⁵
$C_{15}$  3.1555 × 10⁻⁵
FFS②
$C_4$  −6.3947 × 10⁻⁴  $C_6$  −8.9236 × 10⁻³  $C_8$  2.5164 × 10⁻⁴
$C_{10}$  5.4004 × 10⁻⁵  $C_{11}$  −7.1084 × 10⁻⁶  $C_{13}$  −1.3112 × 10⁻⁵
$C_{15}$  6.0361 × 10⁻⁶
FFS③
$C_4$  −9.3660 × 10⁻³  $C_6$  3.1207 × 10⁻²  $C_8$  −3.4094 × 10⁻³
$C_{10}$  1.6934 × 10⁻³  $C_{11}$  1.5776 × 10⁻⁴  $C_{13}$  7.0544 × 10⁻⁵
$C_{15}$  −3.2674 × 10⁻⁴
HOE①
HV1: REA  HV2: REA  HOR:  1
HX1: 0.0  HY1: 0.0  HZ1:  0.0
HX2: 0.0  HY2: 0.0  HZ2:  0.0
(First Layer)

HWL: 630
$H_2$  5.8162 × 10⁻³  $H_3$  −2.7701 × 10⁻³  $H_5$  −7.1217 × 10⁻⁵
$H_7$  −1.7079 × 10⁻⁴  $H_9$  1.8808 × 10⁻⁵  $H_{10}$  6.2670 × 10⁻⁶
$H_{12}$  −2.8904 × 10⁻⁶  $H_{14}$  1.2124 × 10⁻⁶  $H_{16}$  7.0035 × 10⁻⁷
$H_{18}$  4.4748 × 10⁻⁸  $H_{20}$  −1.5532 × 10⁻⁷  $H_{21}$  −6.1624 × 10⁻⁹
$H_{23}$  2.9660 × 10⁻⁸  $H_{25}$  −7.0306 × 10⁻⁹  $H_{27}$  −7.1544 × 10⁻⁹
(Second Layer)

HWL: 520
$H_2$  4.8663 × 10⁻³  $H_3$  −2.3849 × 10⁻³  $H_5$  −9.0966 × 10⁻⁵
$H_7$  −1.5366 × 10⁻⁴  $H_9$  1.8804 × 10⁻⁵  $H_{10}$  5.3088 × 10⁻⁶
$H_{12}$  −2.7147 × 10⁻⁶  $H_{14}$  1.4933 × 10⁻⁶  $H_{16}$  7.4193 × 10⁻⁷
$H_{18}$  5.0327 × 10⁻⁹  $H_{20}$  −1.3634 × 10⁻⁷  $H_{21}$  −1.0116 × 10⁻⁹
$H_{23}$  2.8504 × 10⁻⁸  $H_{25}$  −5.8172 × 10⁻⁹  $H_{27}$  −7.9636 × 10⁻⁹
(Third Layer)

HWL: 470
$H_2$  4.1797 × 10⁻³  $H_3$  −2.1530 × 10⁻³  $H_5$  −1.0820 × 10⁻⁴
$H_7$  −1.3803 × 10⁻⁴  $H_9$  1.8955 × 10⁻⁵  $H_{10}$  4.8880 × 10⁻⁶
$H_{12}$  −2.3165 × 10⁻⁶  $H_{14}$  1.5907 × 10⁻⁶  $H_{16}$  7.1219 × 10⁻⁷
$H_{18}$  −1.3661 × 10⁻⁸  $H_{20}$  −1.2815 × 10⁻⁷  $H_{21}$  −2.4660 × 10⁻¹⁰
$H_{23}$  2.7210 × 10⁻⁸  $H_{25}$  −7.2245 × 10⁻⁹  $H_{27}$  −7.5296 × 10⁻⁹
Displacement and tilt (1)

| X | 0.00 | Y | 0.00 | Z | 0.00 |
|---|---|---|---|---|---|
| α | 0.00 | β | 0.00 | γ | 0.00 |

EXAMPLE 5-continued

| Surface No. Object plane | Radius of curvature | Surface separation | Displacement and tilt | Refractive index | Abbe's No. |
|---|---|---|---|---|---|
| | ∞ | −1000.00 | | | |
| Displacement and tilt (2) | | | | | |
| X | 0.00 | Y | 0.00 | Z | 0.00 |
| α | 0.00 | β | 0.00 | γ | 0.00 |
| Displacement and tilt (3) | | | | | |
| X | 0.00 | Y | 2.75 | Z | 30.72 |
| α | 16.00 | β | 0.00 | γ | 0.00 |
| Displacement and tilt (4) | | | | | |
| X | 0.00 | Y | 0.11 | Z | 37.68 |
| α | −13.85 | β | 0.00 | γ | 0.00 |
| Displacement and tilt (5) | | | | | |
| X | 0.00 | Y | 10.97 | Z | 35.93 |
| α | 79.77 | β | 0.00 | γ | 0.00 |
| Displacement and tilt (6) | | | | | |
| X | 0.00 | Y | 18.33 | Z | 36.75 |
| α | −119.27 | β | 0.00 | γ | 0.00 |

θ = 73.92°
Dx/Rx = −0.0094
Dx/Ry = −0.0094
Da/Ra = −0.0111
Db/Rb = −0.0087

Figure 6:
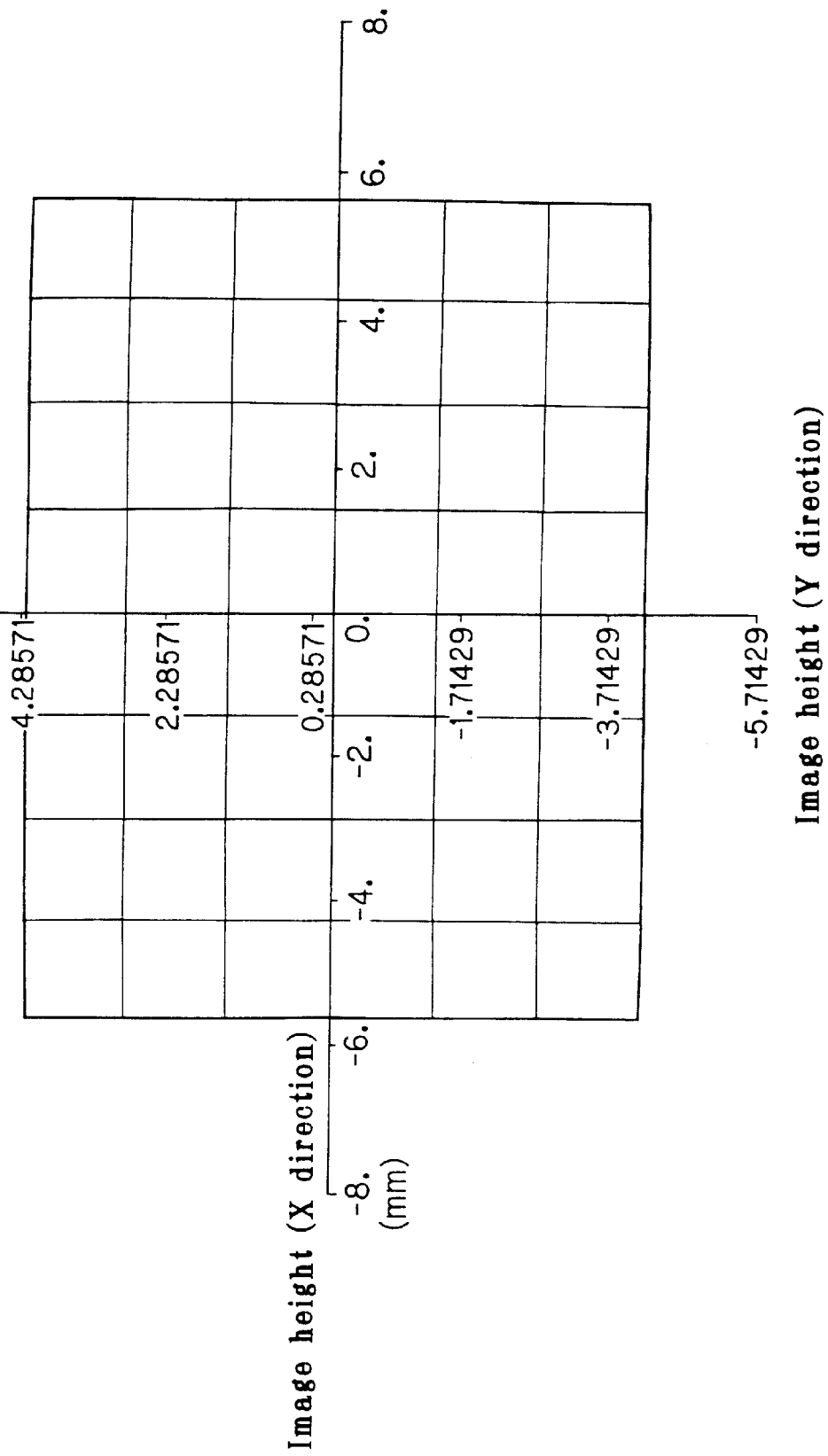
FIG. 6 is an aberrational diagram showing image distortion in Example 1.
Figure 7:
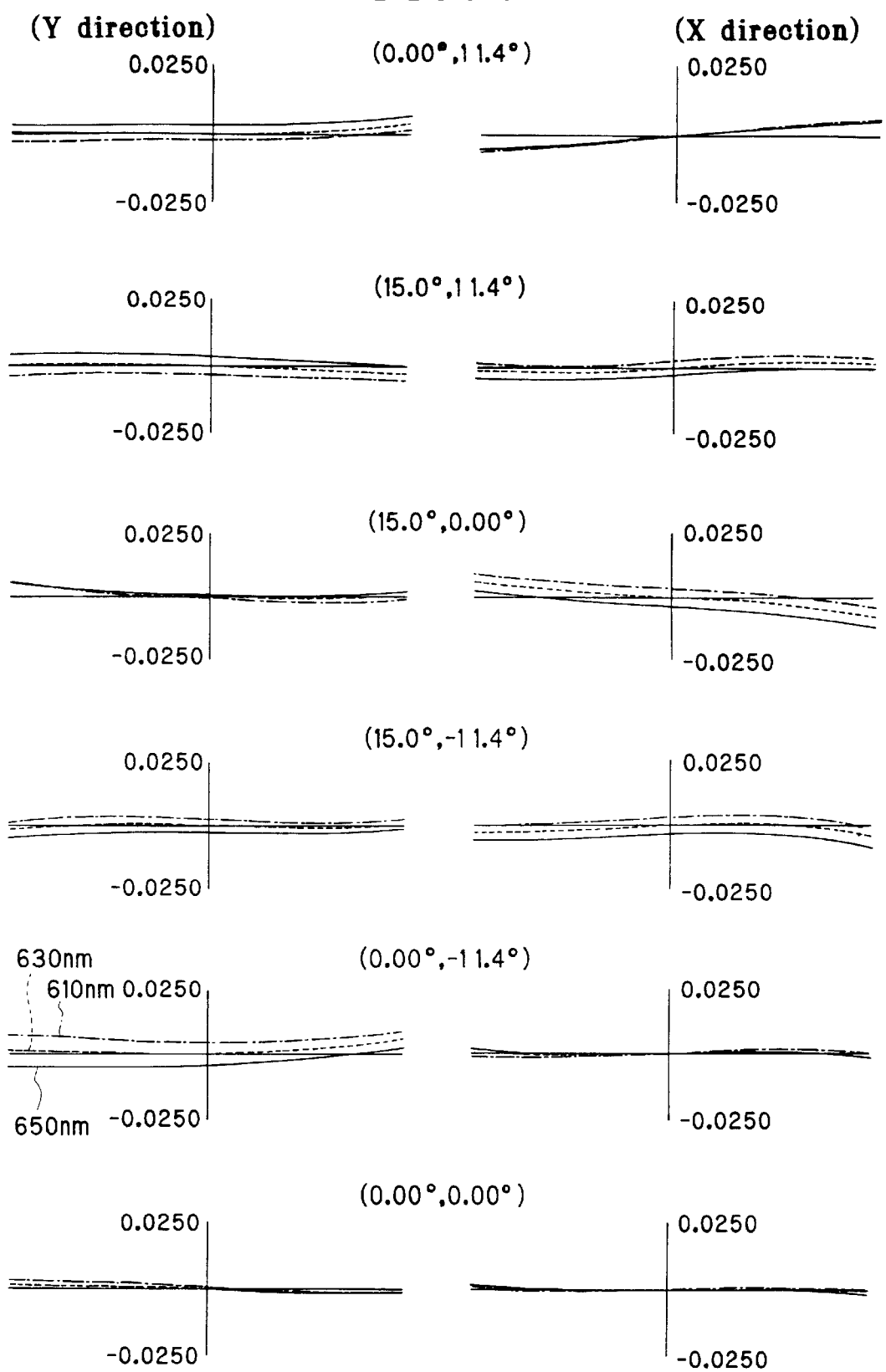
FIG. 7 is an aberrational diagram showing lateral aberrations for the R band (red band) in Example 1.
Figure 8:
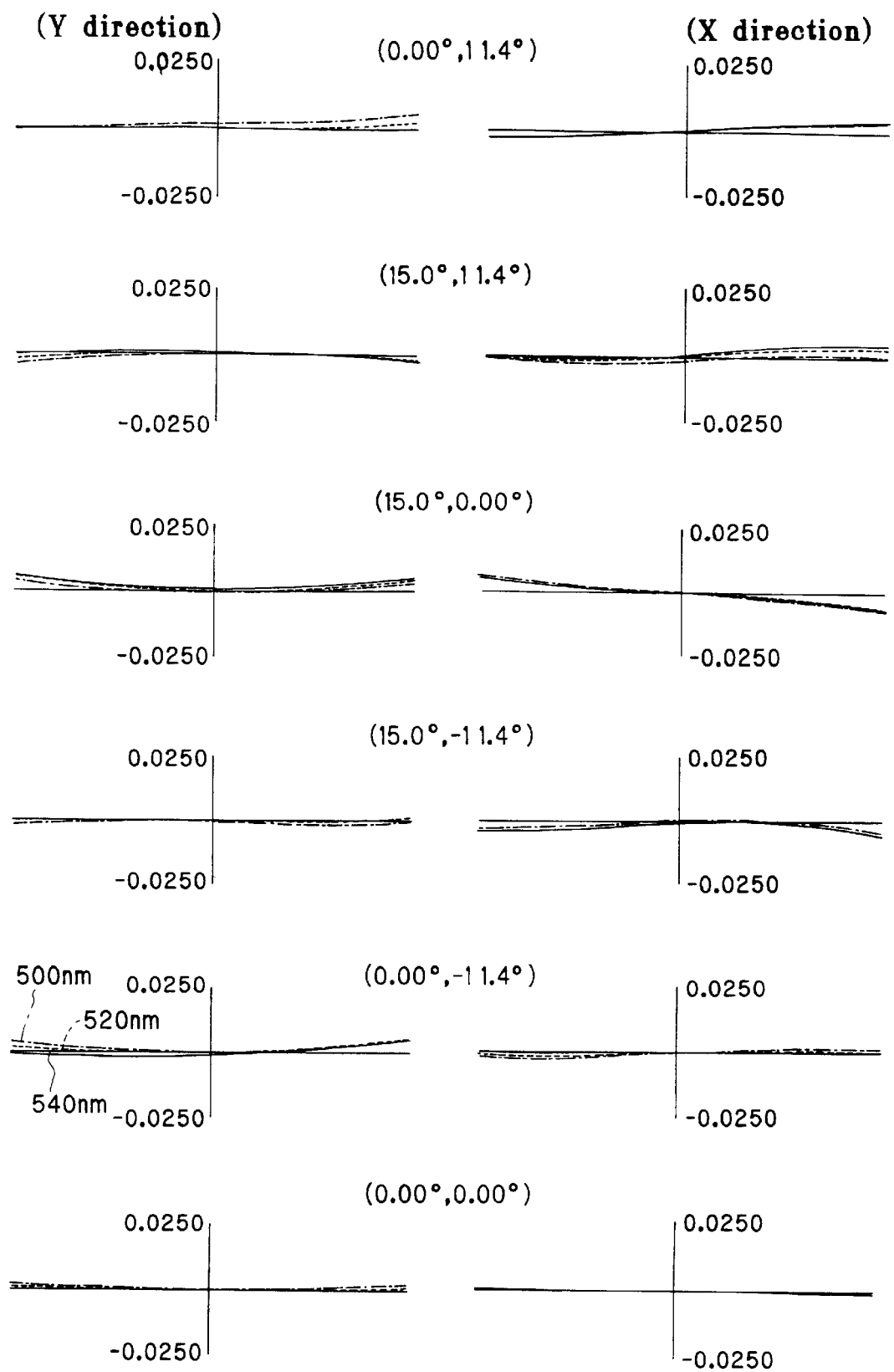
FIG. 8 is an aberrational diagram showing lateral aberrations for the G band (green band) in Example 1.
Figure 9:
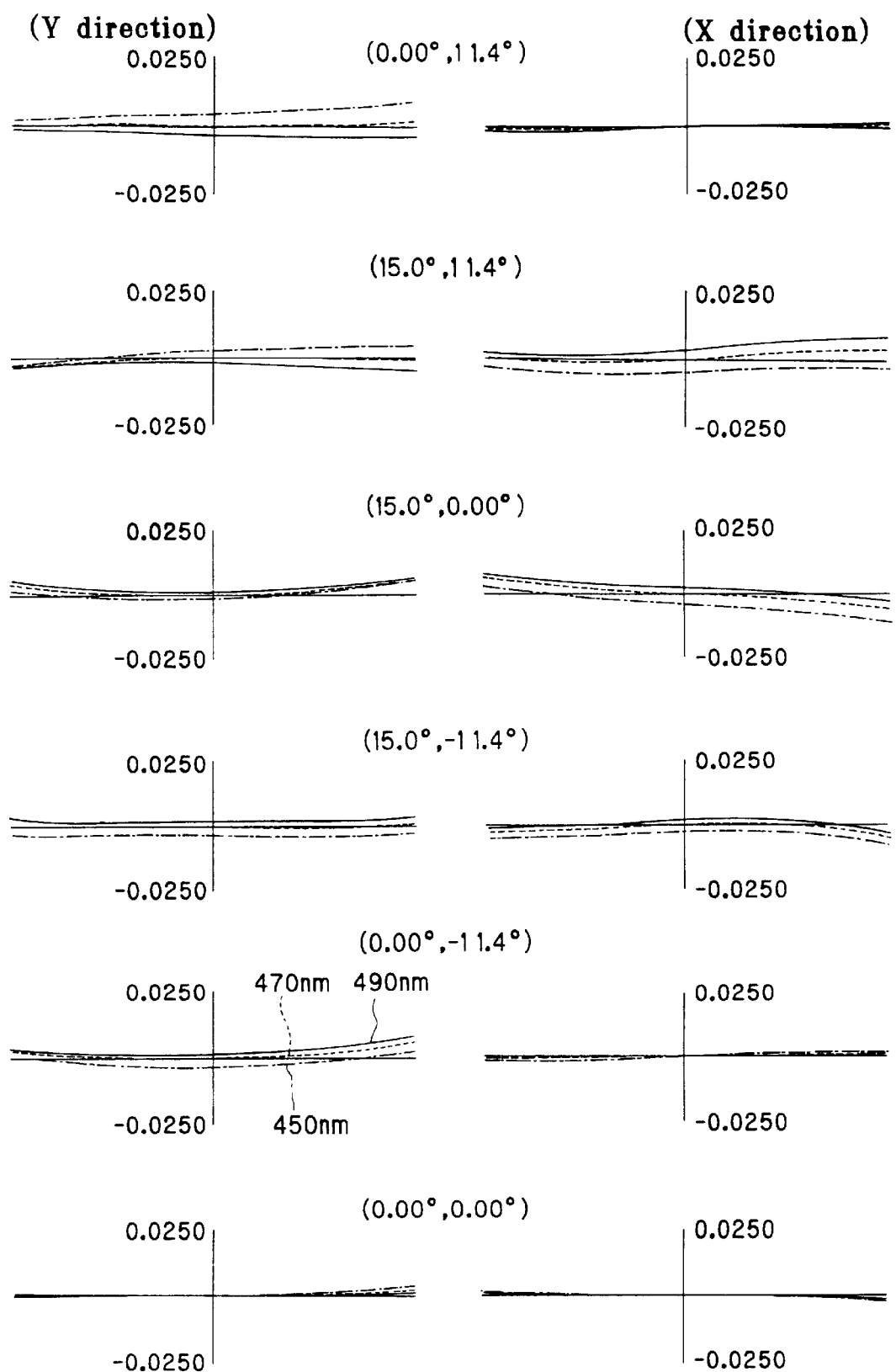
FIG. 9 is an aberrational diagram showing lateral aberrations for the B band (blue band) in Example 1.

Image distortion in Example 1 is shown in FIG. 6, and lateral aberrations in the wavelength regions R, G and B in Example 1 are shown in FIGS. 7 to 9, representatively. In the diagrams showing lateral aberrations, the numerals in the parentheses denote (horizontal field angle, vertical field angle), and lateral aberrations at the field angles are shown.

Figure 11:
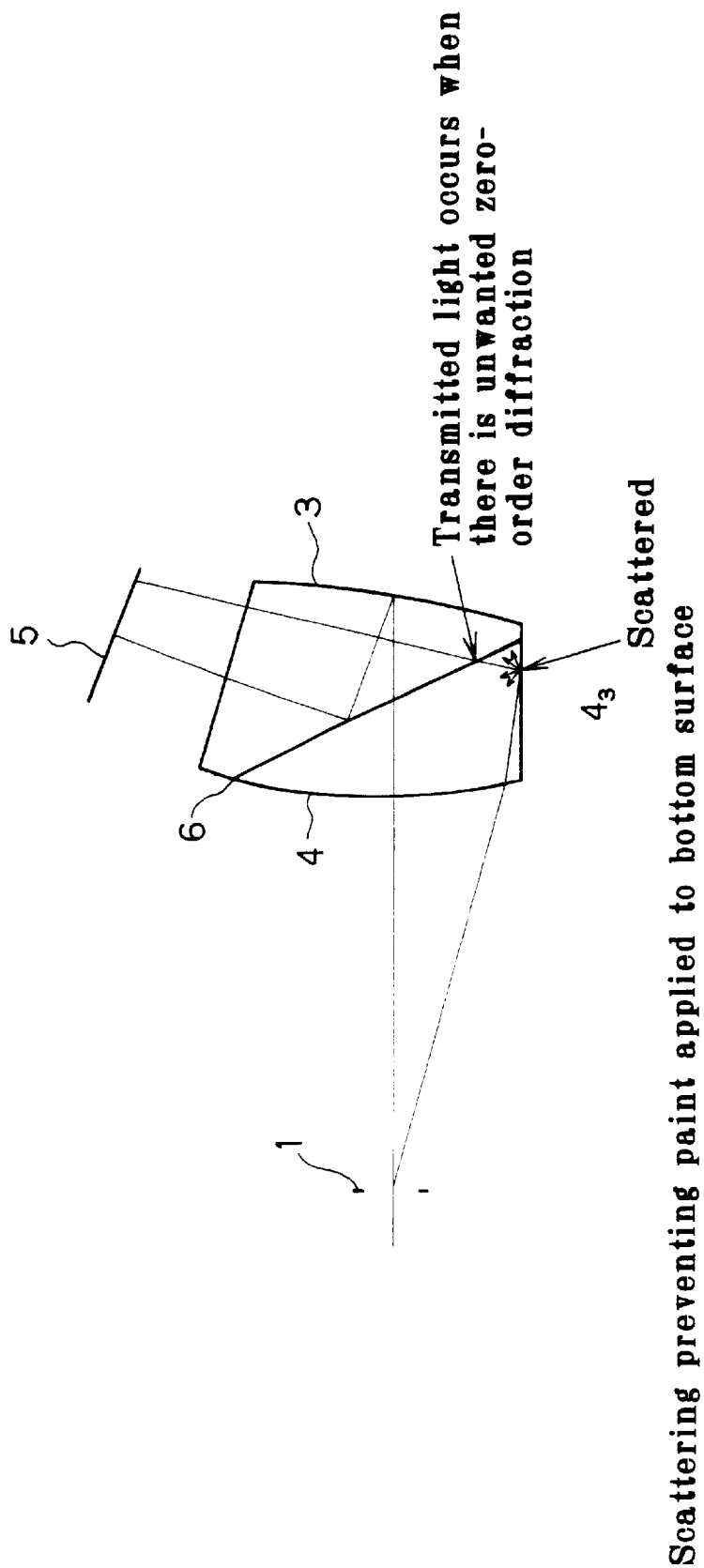
FIG. 11 is a diagram illustrating how light passing through a holographic element without being diffracted gives an adverse effect as ghost light.

FIG. 11 is a sectional view of a viewing optical system as in the foregoing examples, taken along a YZ-plane containing an optical axis thereof, which shows that light passing through the volume hologram 6 without being diffracted may give an adverse effect as ghost light.

Even when a light beam is incident on the volume hologram 6 at the first incident angle in the optical system arranged as in the foregoing examples, light rays in a predetermined wavelength region are not 100% diffracted and reflected, but there may be a slight amount of unwanted order of light that is not diffracted and reflected but passes through the volume hologram 6, as shown in FIG. 11 by way of example.

The undesirably transmitted light may impinge on the bottom surface $4_3$ or side surface (surface extending in a direction perpendicular to the plane of the figure) of the ocular optical system as shown in FIG. 11, by way of example, and the reflected light from the bottom surface $4_3$ or the like may enter the observer's eyeball as ghost light.

Figure 10:
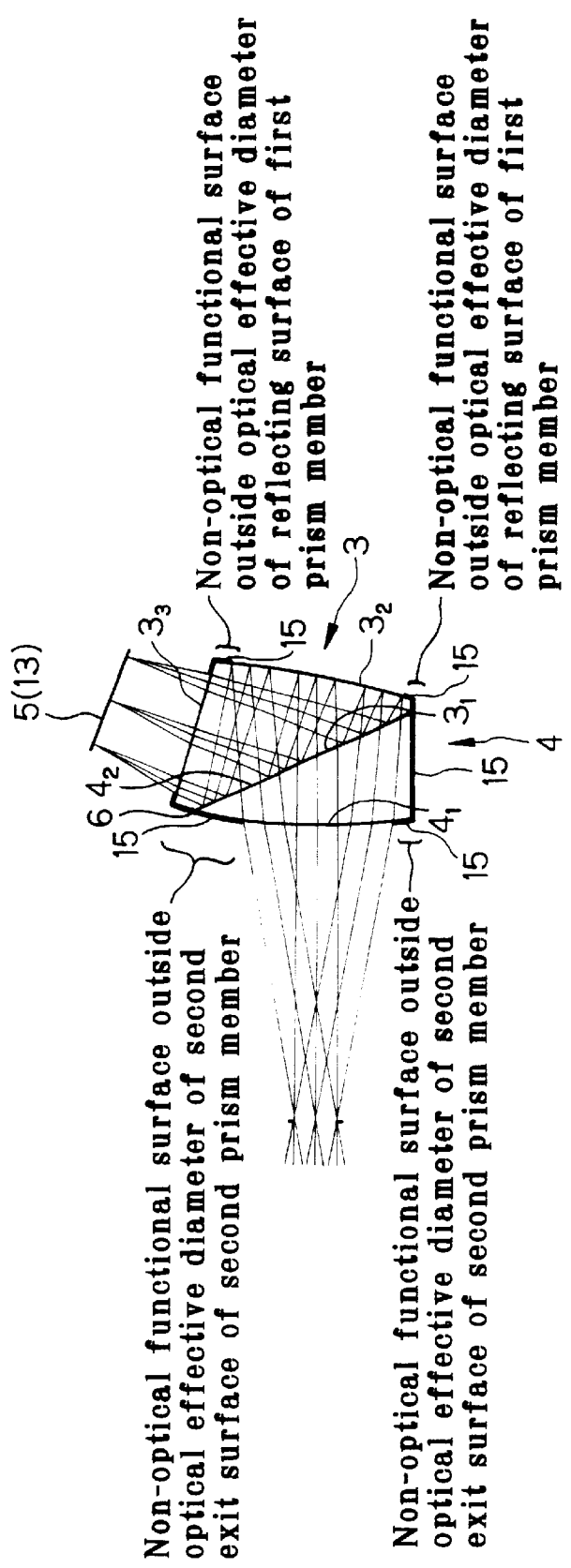
FIG. 10 is a sectional view of a viewing optical system provided with a ghost light eliminating member, taken along a YZ-plane containing an optical axis thereof.

In the present invention, as shown in FIG. 10, the side surfaces of the first prism member 3 and the side surface and bottom surface $4_3$ of the second prism member 4 are each painted with a member having the property of absorbing light, e.g. black paint, as a ghost light eliminating member in addition to the arrangement as shown in each of FIGS. 1 to 5. It should be noted that ghost light eliminating members 15 should preferably be provided on regions included in non-optical functional surfaces (i.e. surfaces other than the optical functional surfaces of the first and second prism members 3 and 4 that transmit or reflect the first light beam), such as the region outside the ray effective diameter of the first entrance surface $3_1$ of the first prism member 3, the region outside the ray effective diameter of the reflecting surface $3_2$ of the first prism member 3, and the region outside the ray effective diameter of the second exit surface $4_1$ of the second prism member 4.

The above-described viewing optical system and image pickup optical system according to the present invention can be used as viewing apparatus in which an object image is viewed through an ocular lens, or as photographic apparatus in which an object image is formed and the formed image is received with an image pickup device, such as a CCD or a silver halide film, to take a photograph of the object. Specific examples of such apparatus are microscopes, head-mounted image display apparatus, endoscopes, projectors, silver halide cameras, digital cameras, VTR cameras, and information processing apparatus incorporating a photographic apparatus, such as personal computers and portable telephones. Embodiments in which the present invention is applied to such apparatuses will be described below.

Figure 12:
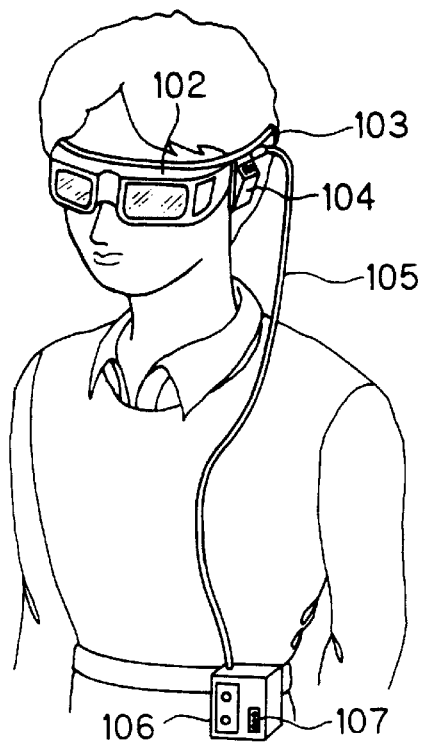
FIG. 12 is a diagram showing a head-mounted image display apparatus for both eyes using a viewing optical system according to the present invention in a state where it is fitted on an observer's head.
Figure 13:
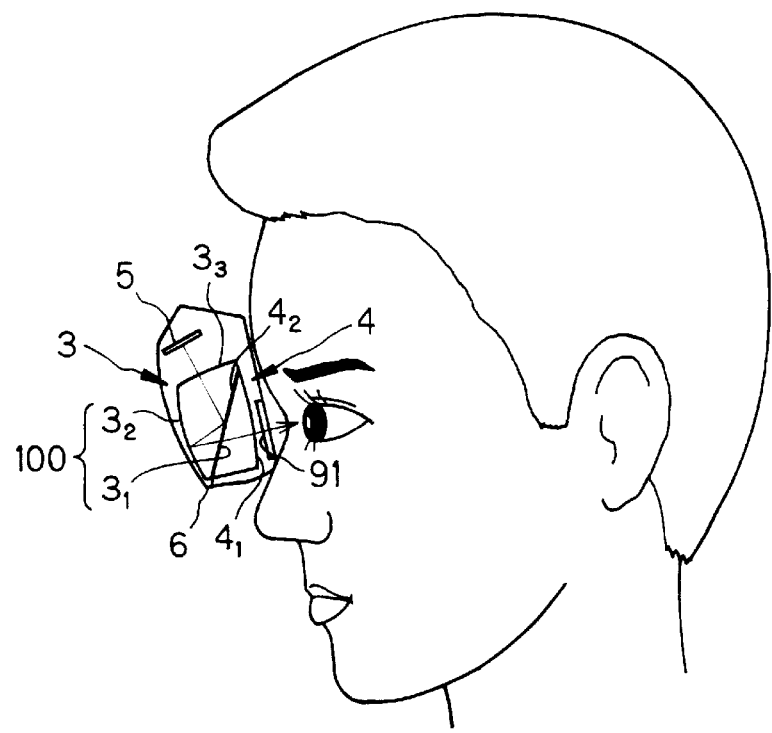
FIG. 13 is a sectional view of the head-mounted image display apparatus shown in FIG. 12.

As one example, a head-mounted image display apparatus arranged for two eyes is shown in FIG. 12. The figure shows the image display apparatus in a state where it is fitted on an observer's head. FIG. 13 is a sectional view of the image display apparatus. As shown in FIG. 13, a viewing optical system according to the present invention is used as an ocular optical system 100 having an image display device 5. A pair of ocular optical systems 100 are prepared for the left and right eyes and supported apart from each other by the interpupillary distance, i.e. the distance between the two eyes, thereby forming a stationary or portable image display apparatus 102, such as a head-mounted image display apparatus, which enables the observer to see with both eyes.

More specifically, the display apparatus body unit 102 is equipped with a pair of ocular optical systems 100 (left and right). The above-described viewing optical system is used as each ocular optical system 100. Image display devices 5, which are liquid crystal display devices, are disposed in the respective image planes of the two ocular optical systems 100. As shown in FIG. 12, the display apparatus body unit 102 is provided with temporal frames 103 that are contiguous with the left and right ends thereof so that the display apparatus body unit 102 can be held in front of the observer's eyes. As shown in FIG. 13, a cover member 91 is placed between the exit pupil of the ocular optical system 100 and the second exit surface $4_1$ of the second prism member 4. As the cover member 91, any of a plane-parallel plate, a positive lens and a negative lens can be used.

Further, a speaker 104 is provided on each temporal frame 103 to enable the user to enjoy listening to stereophonic sound in addition to image observation. The display apparatus body unit 102 having the speakers 104 is connected with a replaying unit 106, e.g. a portable video cassette unit, through an image and sound transmitting cord 105. Therefore, the user can enjoy not only observing an image but also listening to sound with the replaying unit 106 retained on a desired position, e.g. a belt, as illustrated in FIG. 12. Reference numeral 107 in FIG. 12 denotes a switch and volume control part of the replaying unit 106. It should be noted that the display apparatus body unit 102 contains electronic parts such as image and sound processing circuits.

The cord 105 may have a jack and plug arrangement attached to the distal end thereof so that the cord 105 can be detachably connected to an existing video deck. The cord 105 may also be connected to a TV signal receiving tuner so as to enable the user to enjoy watching TV. Alternatively, the cord 105 may be connected to a computer to receive computer graphic images or message images or the like from the computer. To eliminate the bothersome cord, the image display apparatus may be arranged to receive external radio signals through an antenna connected thereto.

Figure 14:
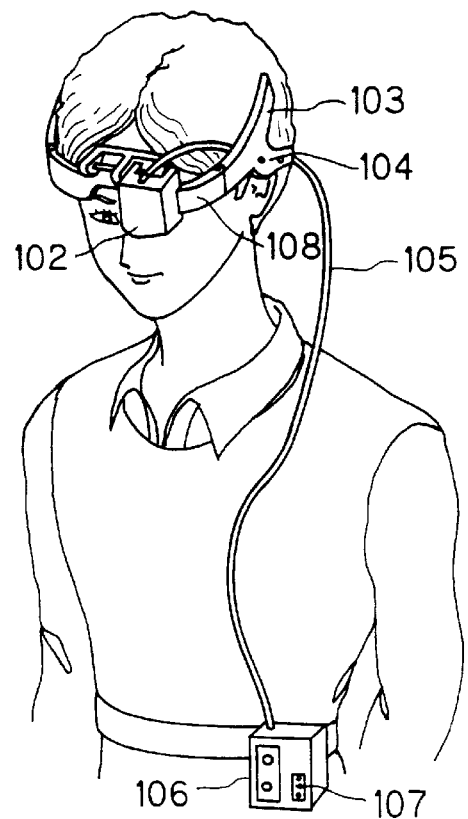
FIG. 14 is a diagram showing a head-mounted image display apparatus for a single eye using a viewing optical system according to the present invention in a state where it is fitted on an observer's head.

The viewing optical system according to the present invention may also be used in a head-mounted image display apparatus for a single eye by placing the ocular optical system in front of either of the left and right eyes. FIG. 14 shows the head-mounted image display apparatus for a single eye in a state where it is fitted on an observer's head (in this case, the apparatus is fitted for the left eye). In the illustrated arrangement, a display apparatus body unit 102 having one set of ocular optical system 100 with an image display device 5 is mounted on a front frame 108 so as to lie in front of the associated eye of the observer. As shown in FIG. 14, the front frame 108 is provided with temporal frames 103 that are contiguous with the left and right ends thereof so that the display apparatus body unit 102 can be held in front of one eye of the observer. The arrangement of the rest of the apparatus is the same as in the case of FIG. 12. Therefore, a description thereof is omitted.

Figure 15:
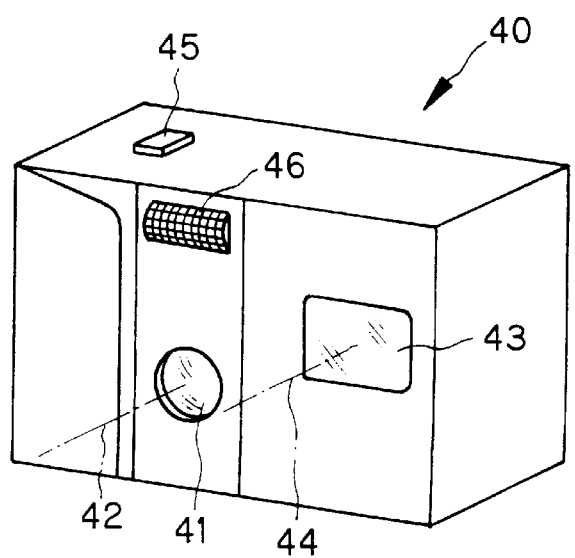
FIG. 15 is a perspective view showing the external appearance of an electronic camera to which an image pickup optical system and a viewing optical system according to the present invention are applied, as viewed from the front side thereof.
Figure 16:
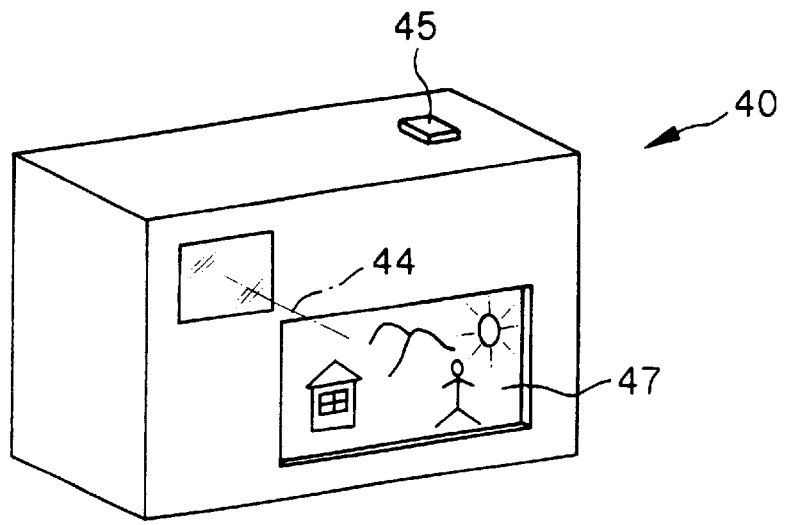
FIG. 16 is a perspective view of the electronic camera shown in FIG. 15, as viewed from the rear side thereof.
Figure 17:
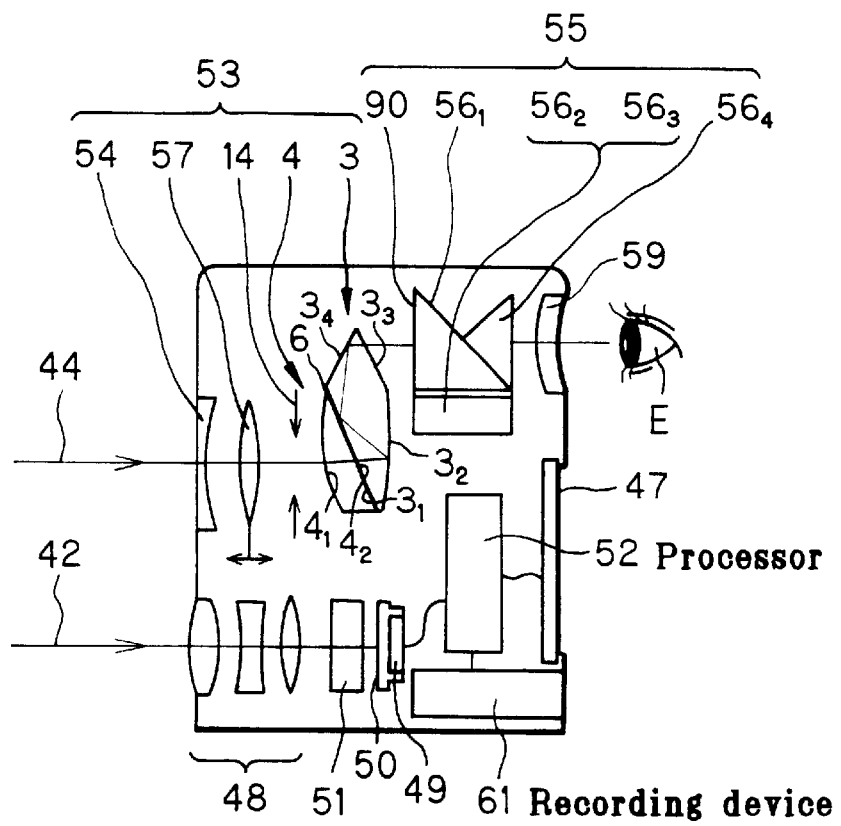
FIG. 17 is a sectional view showing an arrangement of the electronic camera in FIG. 15.

FIGS. 15 to 17 are conceptual views showing an arrangement in which an image pickup optical system according to the present invention is incorporated into an objective optical system constituting a finder unit of an electronic camera 40. FIG. 15 is a perspective view showing the external appearance of the electronic camera 40 as viewed from the front side thereof. FIG. 16 is a perspective view of the electronic camera 40 as viewed from the rear side thereof. FIG. 17 is a sectional view showing the arrangement of the electronic camera 40.

In the illustrated example, the electronic camera 40 includes a photographic optical system 41 having an optical path 42 for photography, a finder optical system 43 having an optical path 44 for the finder, a shutter button 45, a flash 46, a liquid crystal display monitor 47, etc. When the shutter button 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter, an infrared cutoff filter, etc.

The object image received by the CCD 49 is processed in a processor 52 and displayed as an electronic image on the liquid crystal display monitor 47, which is provided on the rear of the camera 40. A recording device 61 is connected to the processor 52 to enable the photographed electronic image to be recorded. It should be noted that the recording device 61 may be provided separately from the processor 52. The arrangement may also be such that the photographed electronic image is electronically recorded or written on a floppy disk or the like. The camera 40 may be arranged in the form of a silver halide camera in which a silver halide film is disposed in place of the CCD 49.

Furthermore, an objective optical system 53 for the finder is placed in the optical path 44 for the finder. The objective optical system 53 for the finder comprises a cover lens 54, a positive lens unit 57 movable in the optical axis direction for focusing, an aperture stop 14, a first prism member 3 and a second prism member 4. The cover lens 54 used as a cover member is a lens unit having a negative power to enlarge the field angle. It should be noted that the first prism member 3 has a reflecting surface $3_4$ in an optical path along which diffracted and reflected light from a hologram 6 provided on the fourth entrance surface $3_1$ travels to reach the fourth exit surface $3_3$, in addition to the arrangement of the first prism member 3 in Examples 1 to 5 of the present invention. An object image produced on an image-formation plane 90 by the objective optical system 53 for the finder is formed on a view frame of a Porro prism 55, which is an image-erecting member.

It should be noted that the view frame is placed between a first reflecting surface $56_1$ and a second reflecting surface $56_2$ of the Porro prism 55. The Porro prism 55 has the first to fourth reflecting surfaces $56_1$ to $56_4$. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 for photography in the electronic camera 40 shown in FIG. 17, it should be noted that the objective optical system 48 for photography may be formed by using not only a refracting coaxial optical system but also any type of image pickup optical systems according to the present invention, which comprise two prism members 3 and 4, as shown in Examples 1 to 5 of the present invention.

The ocular optical system 59 may be arranged by using any type of ocular optical members according to the present invention, which comprises two prism members 3 and 4, as shown in Examples 1 to 5 of the present invention.

Figure 18:
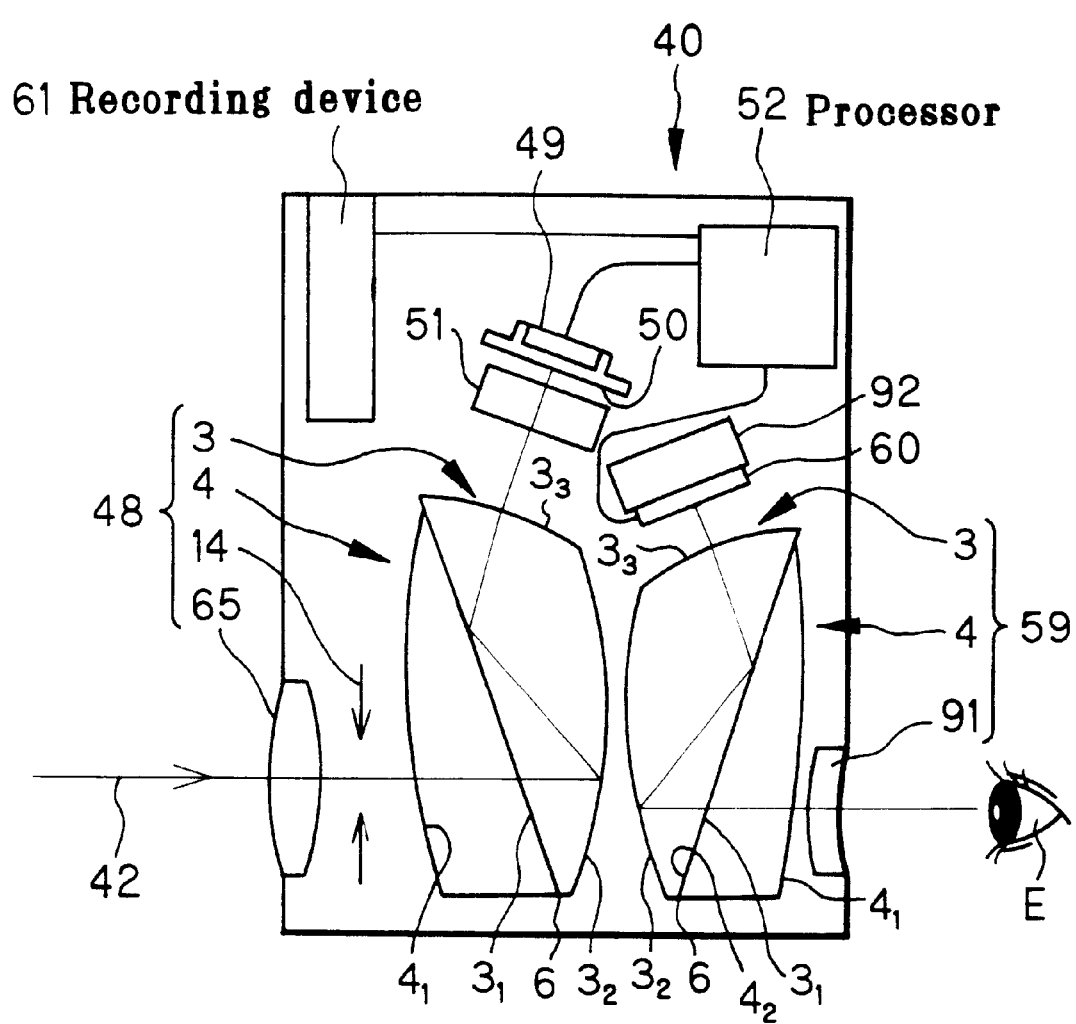
FIG. 18 is a conceptual view of another electronic camera to which an image pickup optical system and a viewing optical system according to the present invention are applied.

FIG. 18 is a conceptual view showing an arrangement in which an image pickup optical system according to the present invention is incorporated into an objective optical system 48 in a photography part of an electronic camera 40 and a viewing optical system according to the present invention is incorporated in an ocular optical system 59 of the electronic camera 40. In this example, objective optical system 48 for photography, which is placed in an optical path 42 for photography, includes a cover member 62 formed from a positive lens and any type of image pickup optical systems according to the present invention, which comprises two prism members 3 and 4, as shown in Examples 1 to 5 of the present invention. In addition, a filter 51, e.g. a low-pass filter, an infrared cutoff filter, etc., is placed between the first prism member 3 and a CCD 49. An object image produced by the objective optical system 48 for photography is formed on an image pickup surface 50 of the CCD 49. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59.

The ocular optical system 59 comprises decentered prism optical systems 3 and 4 having a similar form to that of the viewing optical system as shown in Examples 1 and 2 of the present invention, and a cover lens 91 disposed on the exit pupil side of the decentered prism optical systems 3 and 4. In addition, a backlight 92 is disposed behind the LCD 60 to illuminate it. It should be noted that the objective optical system 48 for photography may include another lens (positive or negative lens) as a constituent element on the object or image side of the two prism members 3 and 4.

In the camera 40 arranged as stated above, the objective optical system 48 for photography and the ocular optical system 59 can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a positive lens is placed as a cover member 65 of the objective optical system 48 for photography, it is also possible to use a negative lens or a plane-parallel plate as the cover member 65.

The surface closest to the object side in the image pickup optical system according to the present invention may be used as a cover member instead of providing a cover member separately. In this example, the third entrance surface $4_1$ of the second prism member 4 is the closest to the object side in the image pickup optical system. In such a case, however, because the entrance surface $4_1$ is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 19A:
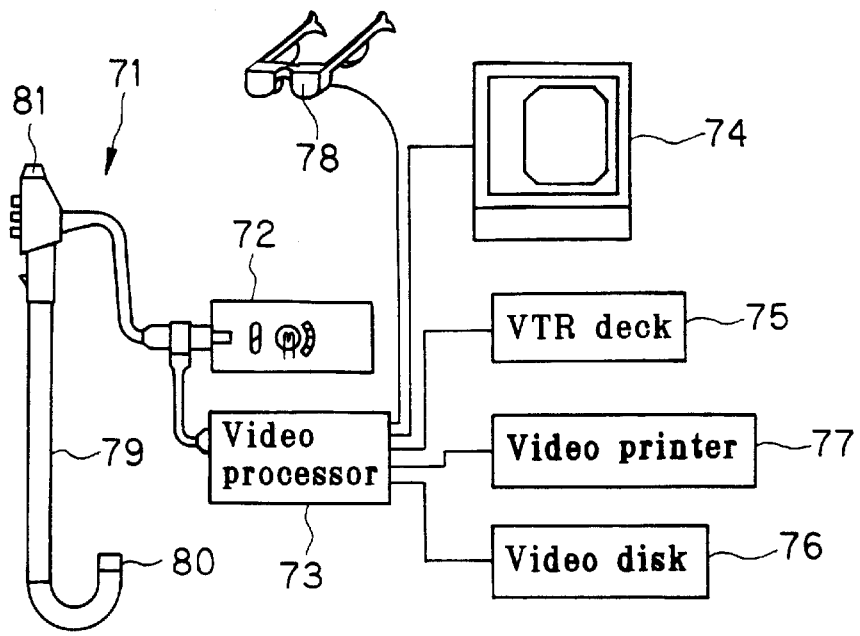
FIGS. 19(*a*) and 19(*b*) are conceptual views of a video endoscope system to which an image pickup optical system and a viewing optical system according to the present invention are applied.
Figure 19B:
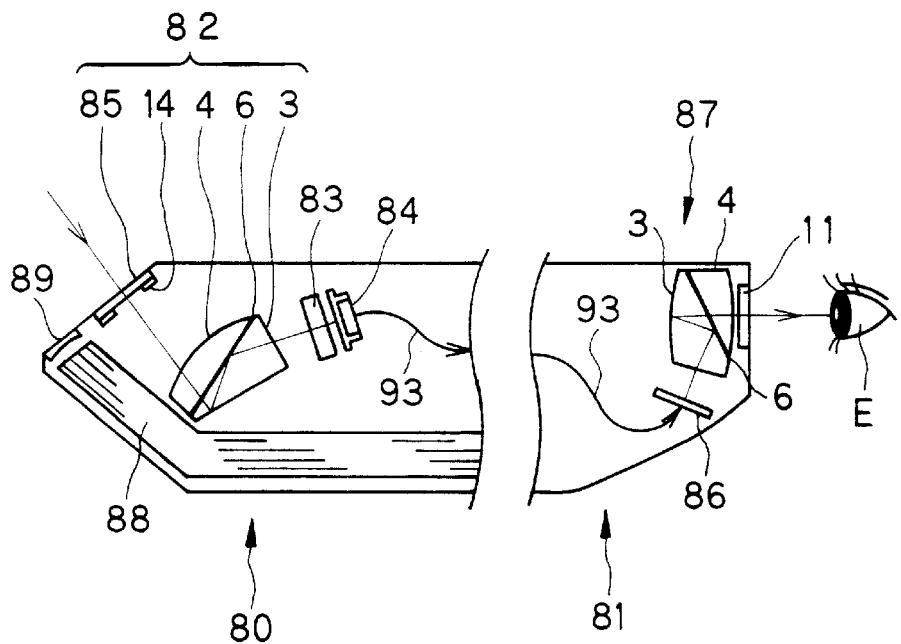

FIGS. 19(*a*) and 19(*b*) are conceptual views showing an arrangement in which an image pickup optical system according to the present invention is incorporated into an objective optical system 82 in an observation system of a video endoscope system, and a viewing optical system according to the present invention is also incorporated into an ocular optical system 87 in the observation system of the video endoscope system. In this example, the objective optical system 82 and the ocular optical system 87 in the observation system each use an optical system approximately similar in configuration to Examples 1 to 5. As shown in FIG. 19(*a*), the video endoscope system includes a video endoscope 71, a light source unit 72 for supplying illuminating light, a video processor 73 for executing processing of signals associated with the video endoscope 71, a monitor 74 for displaying video signals output from the video processor 73, a VTR deck 75 and a video disk 76, which are connected to the video processor 73 to record video signals and so forth, and a video printer 77 for printing out video signals in the form of images. The video endoscope system further includes a head-mounted image display apparatus (HMD) 78 such as that shown in FIG. 12 by way of example. The video endoscope 71 has an insert part 79 with a distal end portion 80 and an eyepiece part 81. The distal end portion 80 and the eyepiece part 81 are arranged as shown in FIG. 19(*b*).

A light beam from the light source unit 72 passes through a light guide fiber bundle 88 and illuminates a part to be observed through an objective optical system 89 for illumination. Light from the part to be observed enters the objective optical system 82 for observation through a cover member 85. Thus, an object image is formed by the objective optical system 82. The object image is formed on the image pickup surface of a CCD 84 through a filter 83, e.g. a low-pass filter, an infrared cutoff filter, etc. Furthermore, the object image is converted into a video signal by the CCD 84. The video signal is displayed directly on the monitor 74 by the video processor 73, which is shown in FIG. 19(*a*). In addition, the video signal is recorded in the VTR deck 75 and on the video disk 76 and also printed out in the form of an image from the video printer 77. In addition, the object image is displayed on the image display device 5 (see FIG. 13) of the HMD 78, thereby allowing a person wearing the HMD 78 to observe the displayed image. At the same time, the video signal converted by the CCD 84 is displayed in the form of an electronic image on a liquid crystal display device (LCD) 86 in the eyepiece part 81 through a video signal transmitting device 93. The displayed image is led to an observer's eyeball E through the ocular optical system 87, which is formed from a viewing optical system according to the present invention.

The endoscope arranged as stated above can be constructed with a minimal number of optical members. Accordingly, a high-performance and low-cost endoscope can be realized. Moreover, because the constituent elements of the objective optical system 82 are arranged in series in the direction of the longitudinal axis of the endoscope, the above-described advantageous effects can be obtained without hindering the achievement of a reduction in the diameter of the endoscope.

Figure 20:
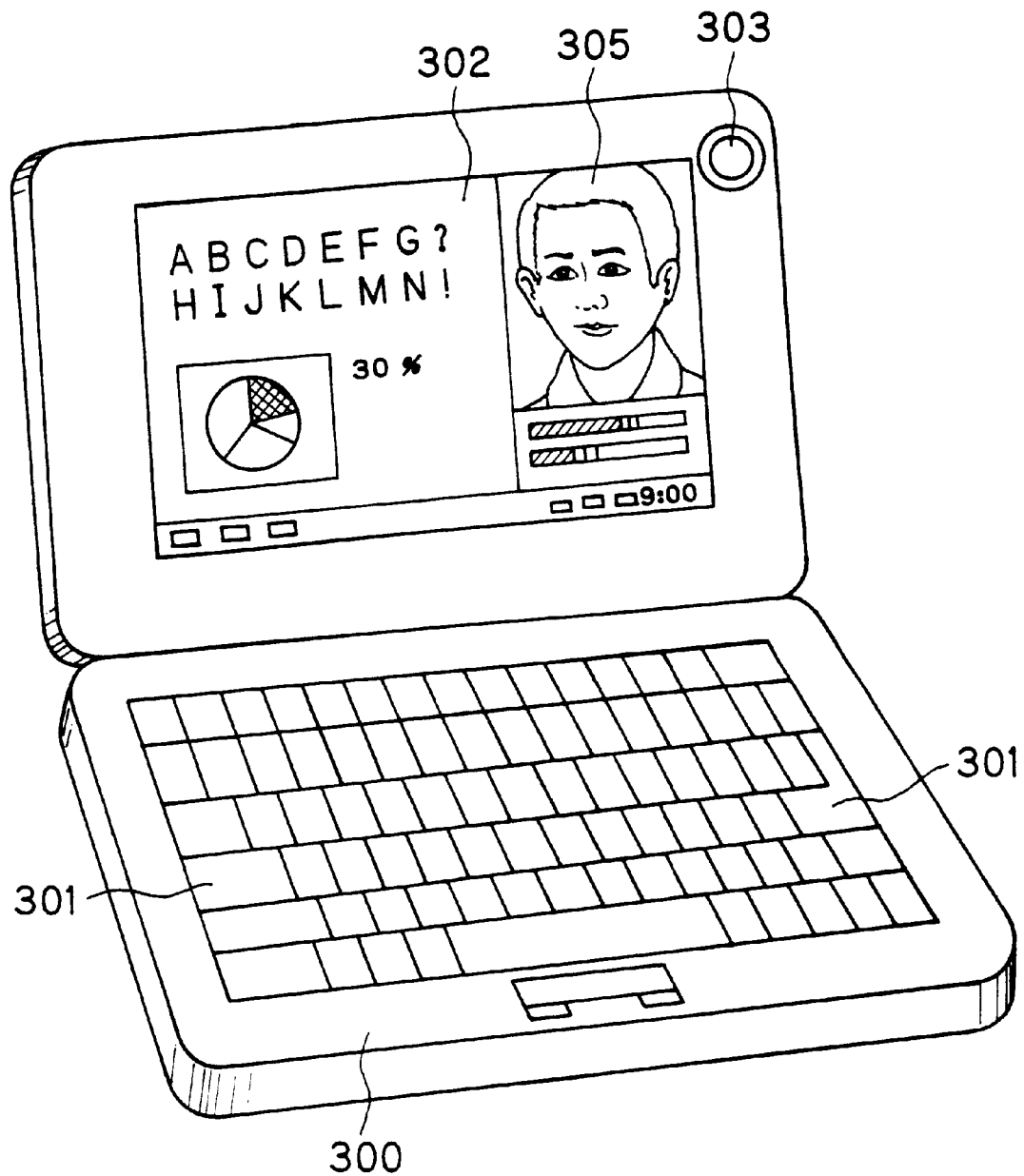
FIG. 20 is a perspective view showing a personal computer incorporating an image pickup optical system according to the present invention as an objective optical system, as viewed from the front side thereof, in a state where a cover is open.
Figure 21:
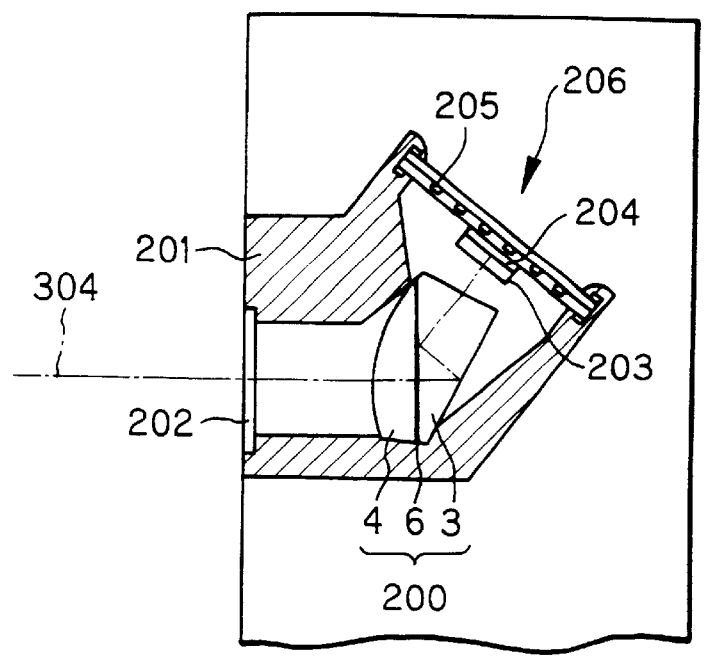
FIG. 21 is a sectional view of a photographic optical system of the personal computer shown in FIG. 20.
Figure 22:
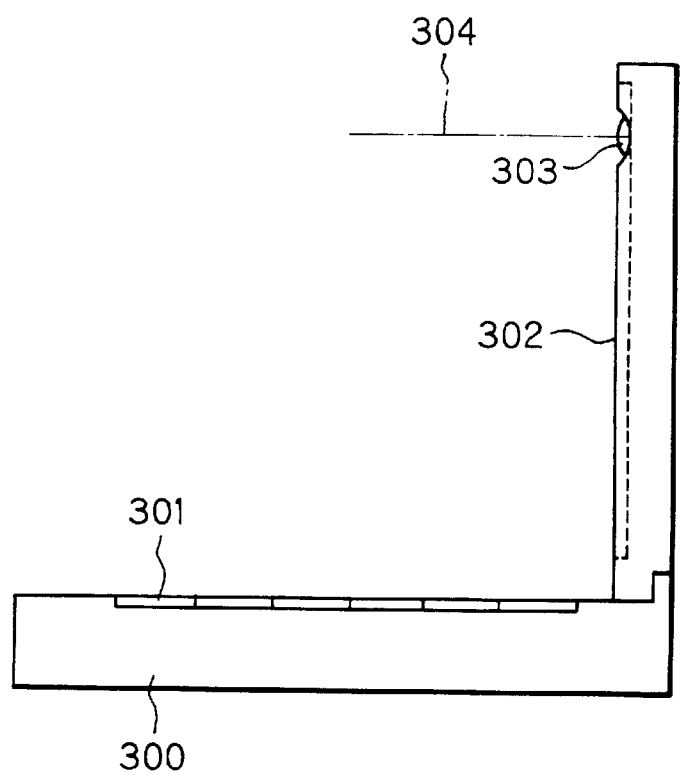
FIG. 22 is a side view of the personal computer in the state shown in FIG. 20.
Figure 24:
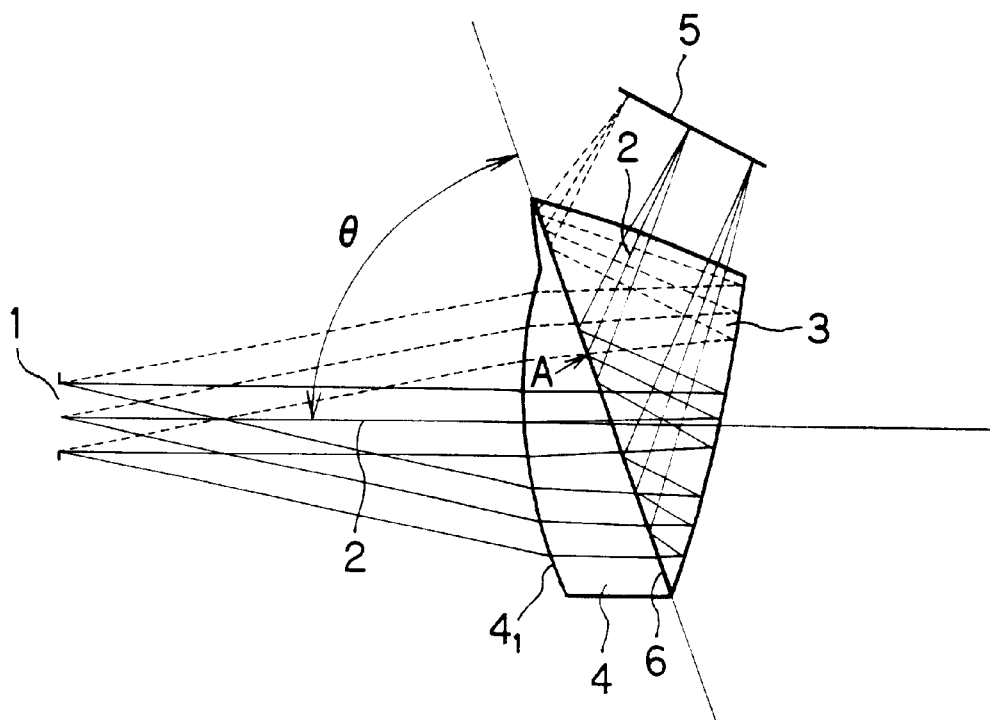
FIG. 24 is a diagram for describing the definition of angle 74.
Figure 25:
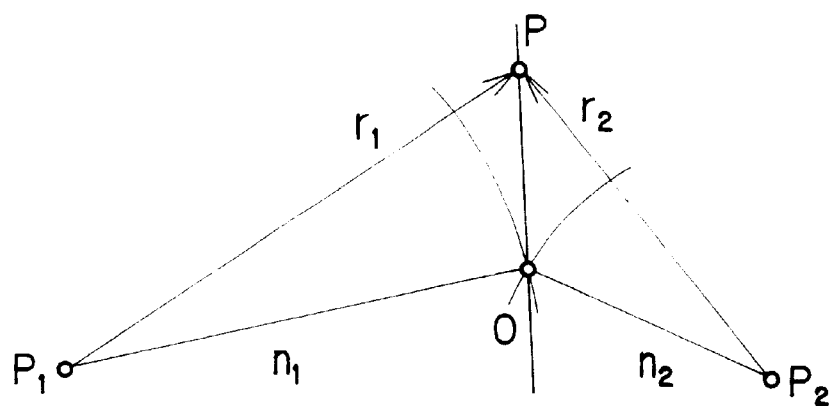
FIG. 25 is a principle diagram for defining an HOE in the present invention.
Figure 26:
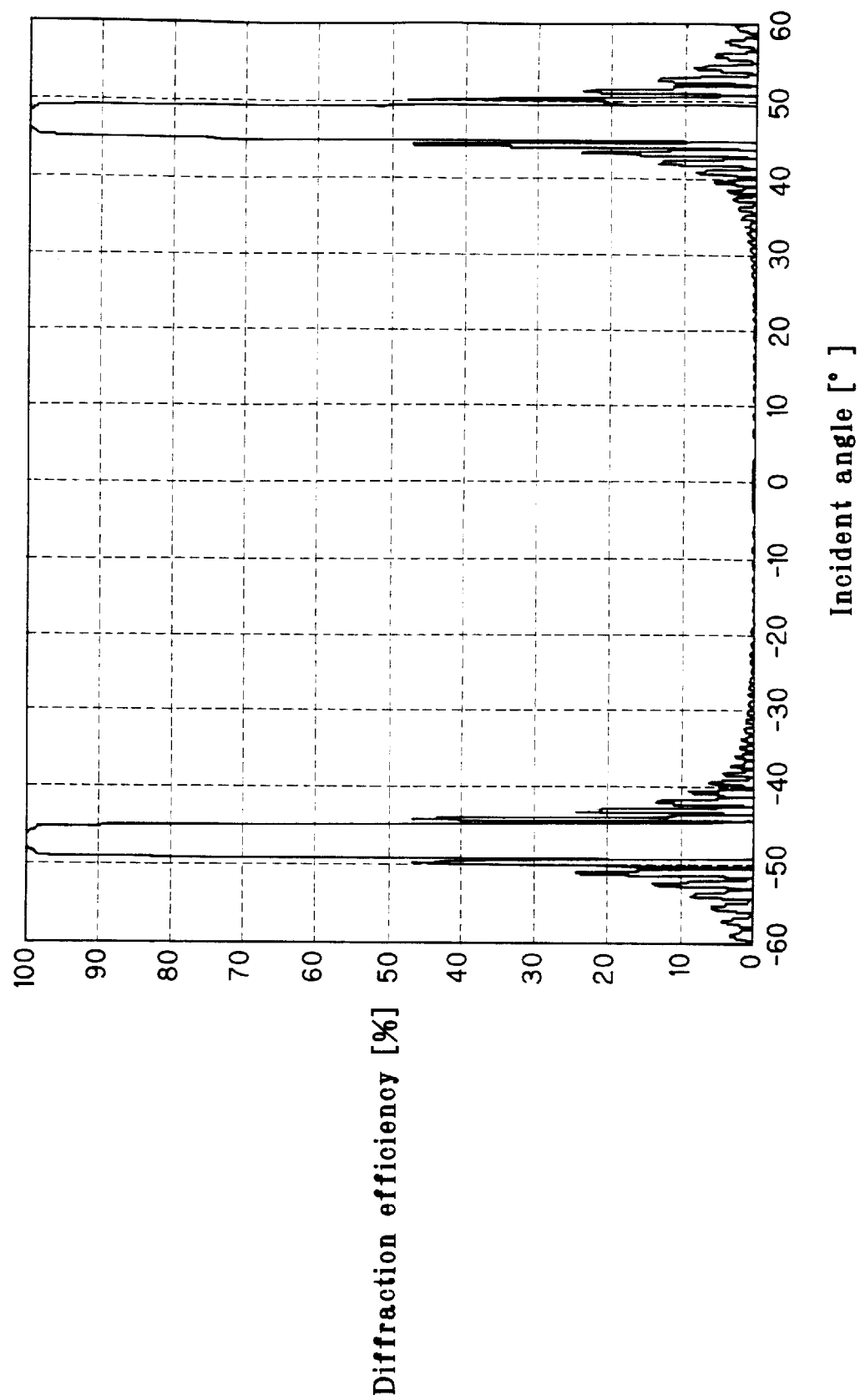
FIG. 26 is a graph showing the diffraction efficiency of a volume hologram according to the present invention with respect to the incident angle of an axial principal ray of wavelength 520 nm.
Figure 27:
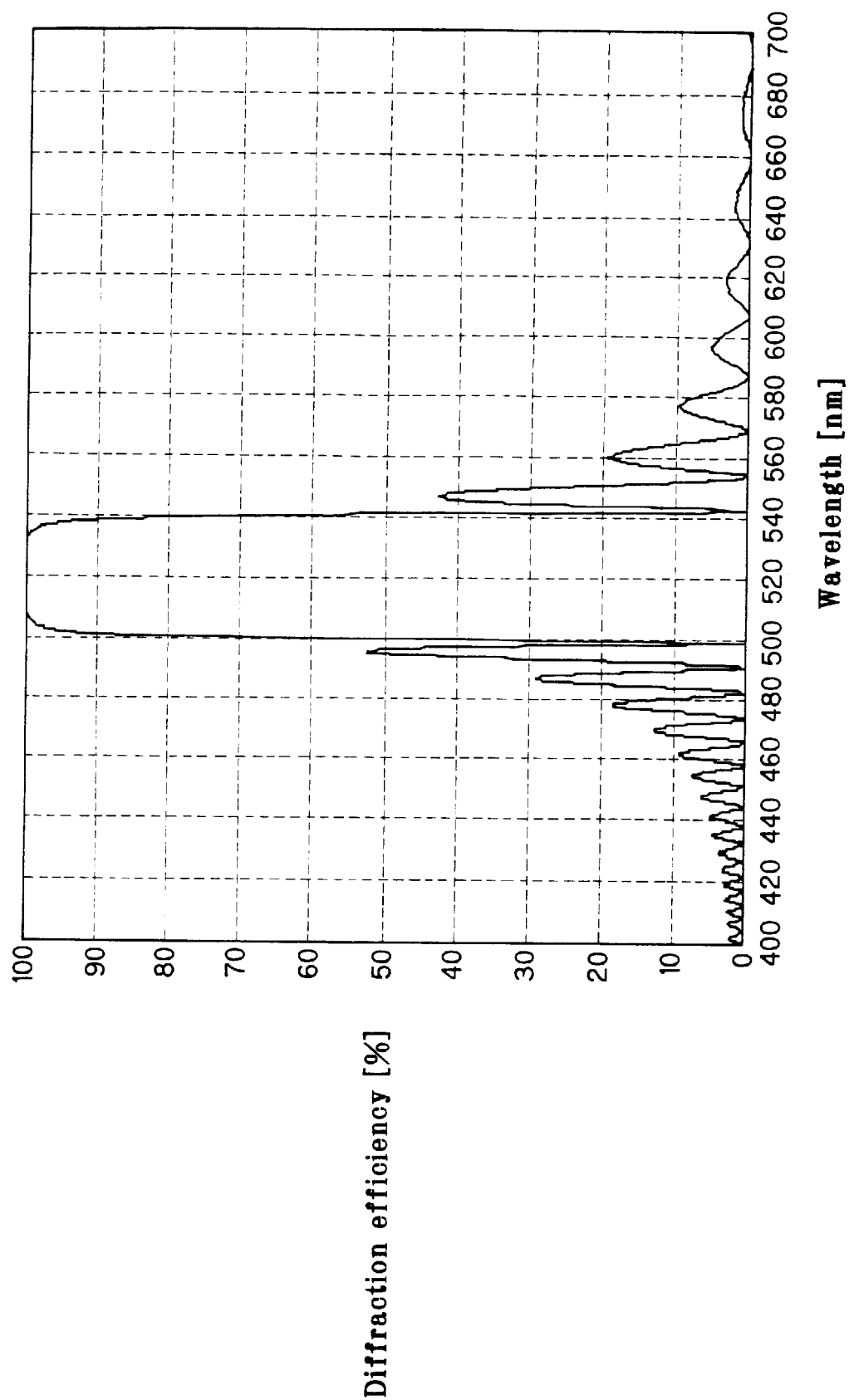
FIG. 27 is a graph showing the diffraction efficiency of a volume hologram according to the present invention for an axial principal ray incident at an angle of 47.3° with respect to wavelength.

FIGS. 20 to 22 are conceptual views showing an arrangement in which an image pickup optical system according to the present invention is incorporated in a personal computer as an example of information processing apparatus.

FIG. 20 is a perspective view of a personal computer 300 as seen from the front side thereof in a state where a cover thereof is open. FIG. 21 is a sectional view of a photographic optical system 303 of the personal computer 300, and FIG. 22 is a side view of the personal computer 300 shown in FIG. 20. As shown in FIGS. 20 to 22, the personal computer 300 has a keyboard 301 used by an operator to input information externally, and information processing and recording devices (not shown). The personal computer 300 further has a monitor 302 for displaying information for the operator, and a photographic optical system 303 for taking a photograph of the operator or an image of a surrounding object. In this case, the monitor 302 may be a transmissive liquid crystal display, which is illuminated from the rear side by a backlight (not shown), or a reflective liquid crystal display, which displays information by reflecting light applied from the front side thereof. The monitor 302 may also be a CRT display or the like. Although the photographic optical system 303 is incorporated in a portion at the top right corner of the monitor 302, the position of the photographic optical system 303 is not necessarily limited to the illustrated position. The photographic optical system 303 may be provided at any position around the monitor 302 or around the keyboard 301.

The photographic optical system 303 has, in a photographic optical path 304, an objective optical system 200 comprising an image pickup optical system according to the present invention, and an image pickup chip 204 for receiving an image. These constituent elements are incorporated in the personal computer 300.

In this case, the image pickup chip 204 has additionally an IR cutoff filter 203 integrally stuck thereon to form an image pickup unit 206. Thus, the image pickup unit 206 can be mounted in a one-touch simple operation by fitting it to the rear end of a lens frame 201 of the objective optical system 200. Accordingly, it is unnecessary to perform centering of the objective optical system 200 and the image pickup chip 204 and adjustment of surface separation. Therefore, the assembly is easy. A cover glass 202 is disposed at the distal end of the lens frame 201 to protect the objective optical system 200.

An object image received by the image pickup chip 204 is input to a processing device of the personal computer 300 through terminals 205 and displayed on the monitor 302 in the form of an electronic image. FIG. 20 shows a photographed image 305 of the operator as an example of the electronic image. The image 305 can also be transferred so as to be displayed on a personal computer of the person on the other end of a communication line from a remote place through the processing device via the internet or telephone lines.

FIGS. 23(*a*) to 23(*c*) show a telephone as another example of information processing apparatus, particularly an example in which an image pickup optical system according to the present invention is incorporated in a portable telephone, which is handy to carry.

FIG. 23(*a*) is a front view of a portable telephone 400, and FIG. 23(*b*) is a side view thereof. FIG. 23(*c*) is a sectional view of a photographic optical system 405. As shown in FIGS. 23(*a*) to 23(*c*), the portable telephone 400 has a microphone unit 401 for inputting the voice of the operator as information and a speaker unit 402 for outputting the voice of the person on the other end of a communication line. The portable telephone 400 further has input keys 403 used by the operator to input information, and a monitor 404 for displaying information, e.g. a photographed image of the operator or the person on the other end of the line and a telephone number. In addition, the portable telephone 400 has a photographic optical system 405, an antenna 406 for transmitting and receiving electric waves for telephonic communication, and a processing unit (not shown) for processing image information, communication information, input signals, etc. The monitor 404 is a liquid crystal display device. The layout of the constituent elements shown in the figures is not necessarily limited to the illustrated layout. The photographic optical system 405 has an objective optical system 200 comprising an image pickup optical system according to the present invention, and an image pickup chip 204 for receiving an image. The objective optical system 200 and the image pickup chip 204 are placed in a photographic optical path 407 and incorporated in the portable telephone 400.

In this case, the image pickup chip 204 has additionally an IR cutoff filter 203 integrally stuck thereon to form an image pickup unit 206. Thus, the image pickup unit 206 can be mounted in a one-touch simple operation by fitting it to the rear end of, a lens frame 201 of the objective optical system 200. Accordingly, it is unnecessary to perform centering of the objective optical system 200 and the image pickup chip 204 and adjustment of surface separation. Therefore, the assembly is easy. A cover glass 202 is disposed at the distal end of the lens frame 201 to protect the objective optical system 200.

An object image received by the image pickup chip 204 is input to the processing unit (not shown) through terminals 205 and displayed in the form of an electronic image on the monitor 404 or on the monitor of a person on the other end of a communication line. Alternatively, the object image is displayed on both the monitors. The processing unit further includes a signal processing function to covert information concerning the object image received by the image pickup chip 204 into a transmittable signal when the image is to be transmitted to the person on the other end of the communication line.

Figure 28:
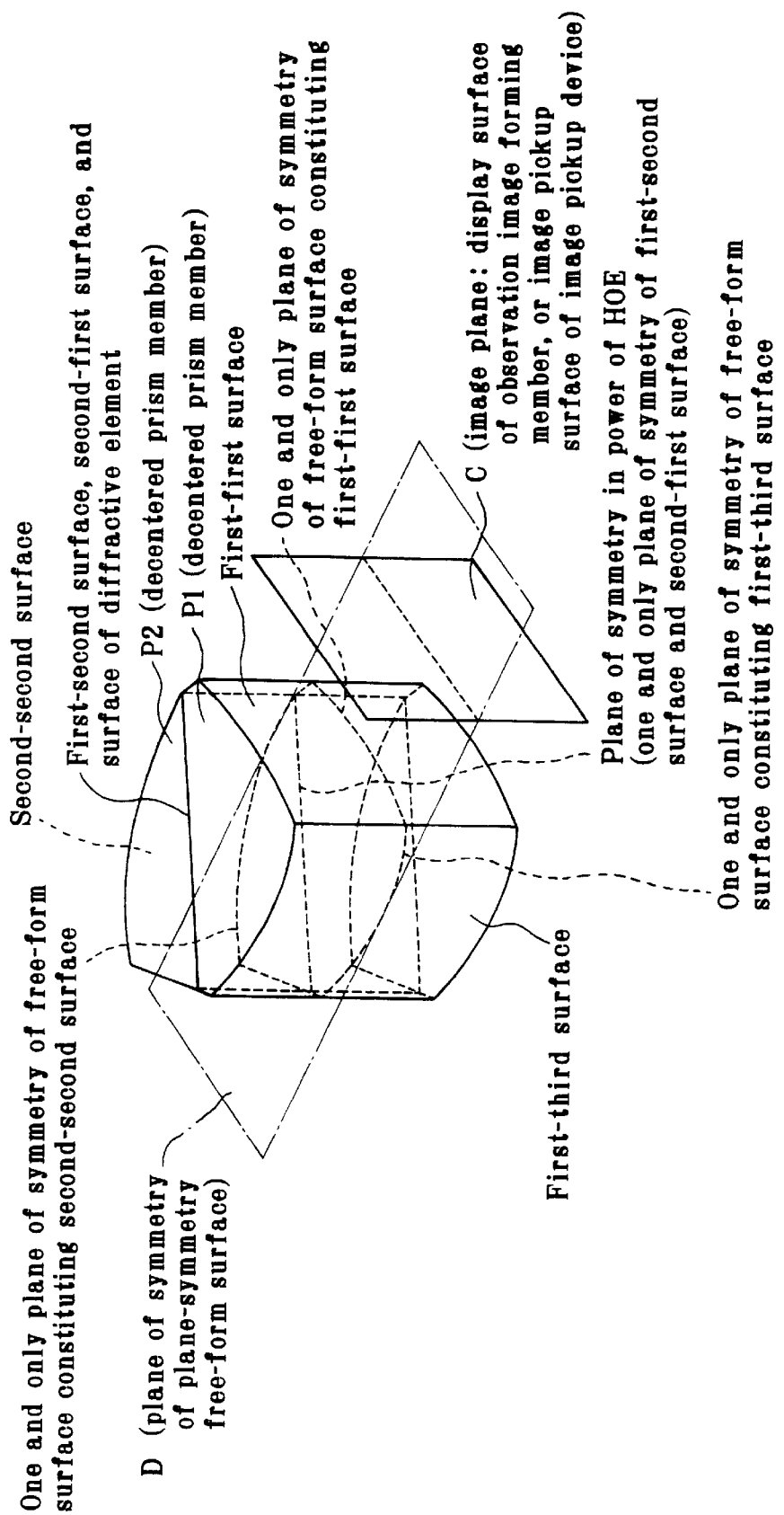
FIG. 28 is a diagram showing a desirable arrangement for an optical system according to the present invention when an HOE is disposed in a prism constituting the optical system.
Figure 29A:
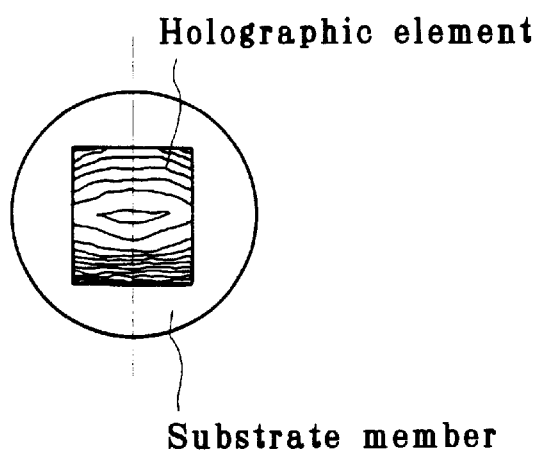
FIGS. 29(a) and 29(b) are a front view and a side view, respectively, for describing two different kinds of power obtained when a holographic element is provided on a substrate member having a spherical surface.
Figure 29B:
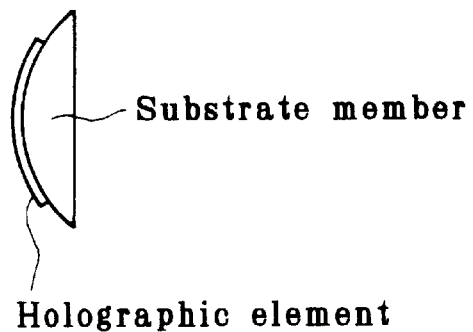

FIG. 28 shows a desirable arrangement for the optical system according to the present invention when a diffractive element such as a volume hologram is provided in a prism constituting the optical system. In the figure, decentered prism members P1 and P2 are a first prism member 3 and a second prism member 4 included in the viewing optical system or the image pickup optical system according to the present invention. When the image plane C (e.g. the display surface of the image display device 5 or the image pickup surface of the image pickup device 13) forms a quadrangle as shown in the figure, it is desirable from the viewpoint of forming a beautiful image to place the decentered prism members P1 and P2 so that when the first-first surface (the first entrance surface 33 of the first prism member 3) of the decentered prism member P1 or the second-second surface (the second exit surface $4_1$ of the second prism member 4) of the decentered prism member P2 is formed in the shape of a plane-symmetry free-form surface, the plane D of symmetry of the plane-symmetry free-form surface is parallel to at least one of the four sides forming the image plane C.

When the image plane C has a shape in which each of the four interior angles is approximately 90 degrees, such as a square or a rectangle, it is desirable that the plane D of symmetry of the plane-symmetry free-form surface should be parallel to two sides of the image plane C that are parallel to each other. It is more desirable that the plane D of symmetry should lie at the middle between the two parallel sides and coincide with a position where the image plane C is in a symmetry between the right and left halves or between the upper and lower halves. The described arrangement enables the required assembly accuracy to be readily obtained when the optical system is incorporated into an apparatus, and is useful for mass-production.

When a plurality or all of the optical surfaces constituting the decentered prism members P1 and P2, i.e. the first-first surface (the first entrance surface $3_3$ of the first prism member 3), the first-second surface (the first exit surface $3_1$ of the first prism member 3), the first-third surface (the reflecting surface $3_2$ of the first prism member 3), the second-first surface (the second entrance surface $4_2$ of the second prism member 4), and the second-second surface (the second exit surface $4_1$ of the second prism member 4), are plane-symmetry free-form surfaces, it is desirable from the viewpoint of design and aberration correcting performance to arrange the decentered prism members P1 and P2 so that the planes of symmetry of the plurality or all of the optical surfaces are in the same plane D. In addition, it is desirable that the plane D of symmetry and the plane of symmetry in power of the diffractive element 6 should be in the above-described relationship.

In the foregoing, the viewing optical system and the image pickup optical system according to the present invention, together with the apparatus using either or both of the optical systems, have been described on the basis of the embodiments thereof. It should be noted, however, that the present invention is not necessarily limited to the foregoing embodiments but can be modified in a variety of ways.

Thus, it is possible according to the present invention to provide a viewing optical system that allows observation of a bright displayed image favorably corrected for aberrations and also provide an image pickup optical system capable of picking up a bright object image favorably corrected for aberrations. The viewing optical system and the image pickup optical system are easy to assemble, resistant to impact such as vibration, lightweight and compact. The present invention also provides apparatus using the viewing optical system and/or the image pickup optical system.

What we claim is:

1. A viewing optical system comprising:
    an observation image forming member for forming an observation image to be viewed by an observer; and
    an ocular optical member for leading the observation image formed by said observation image forming member to an exit pupil formed at a position of an observer's eyeball;
    said ocular optical member including at least a first prism member and a second prism member;
    said first prism member having at least:
        a first entrance surface through which light rays from said observation image enter said first prism member;
        a reflecting surface reflecting the light rays within said first prism member; and
        a first exit surface through which the light rays exit said first prism member;
        wherein said first entrance surface, said reflecting surface and said first exit surface are disposed to face each other across a first prism medium;
    said second prism member having at least:
        a second entrance surface through which the light rays exiting from said first prism member enter said second prism member; and
        a second exit surface through which the light rays exit said second prism member;
        wherein said second entrance surface and said second exit surface are disposed to face each other across a second prism medium;
    said first prism member and said second prism member being cemented together with a holographic element interposed between said first exit surface and said second entrance surface;
    wherein said reflecting surface of said first prism member is a concave surface that gives a positive power to the light rays when reflecting them; and
    wherein said first exit surface and said second entrance surface are each formed from a plane surface or a cylindrical surface.

2. A viewing optical system according to claim 1, wherein said first entrance surface of said first prism member has a curved surface configuration that gives a power to the light rays when they pass through said surface, and said second exit surface of said second prism member has a curved surface configuration that gives a power to the light rays when they pass through said surface.

3. A viewing optical system according to claim 1, wherein said first prism medium and said second prism medium are a same medium.

4. A viewing optical system according to claim 1, wherein the first exit surface of said first prism member and the second entrance surface of said second prism member have approximately a same surface configuration.

5. A viewing optical system according to claim 1, wherein a ghost light eliminating member that prevents ghost light from entering the observer's eyeball is provided on a non-optical functional surface other than optical functional surfaces of said first prism member and said second prism member that transmit or reflect the light rays.

6. A viewing optical system according to claim 1, wherein the first entrance surface of said first prism member has a rotationally asymmetric curved surface configuration.

7. A viewing optical system according to claim 6, wherein said rotationally asymmetric curved surface configuration is a free-form surface having only one plane of symmetry, and said plane of symmetry is coincident with a plane (YZ-plane) in which an optical axis is folded.

8. A viewing optical system according to claim 1, wherein said holographic element is arranged to correct the light rays for both rotationally symmetric and rotationally asymmetric components of lateral chromatic aberration by reflection and diffraction.

9. A viewing optical system according to claim 1, wherein the following condition (1) is satisfied:

$$45° < \theta < 85° \quad (1)$$

wherein θ is an angle between a tangential plane at a position of intersection between an axial principal ray and a substrate surface of said holographic element and the axial principal ray traveling from a surface of said viewing optical system closest to said exit pupil to reach said exit pupil.

10. A viewing optical system according to claim 1, wherein said second exit surface of said second prism member has a rotationally asymmetric curved surface configuration that corrects at least either one of rotationally asymmetric coma and astigmatism produced in said ocular optical member.

11. A viewing optical system according to claim 10, wherein said rotationally asymmetric curved surface configuration is a free-form surface having only one plane of symmetry, and said plane of symmetry is coincident with a plane (YZ-plane) in which an optical axis is folded.

12. A viewing optical system according to claim 1, wherein when a plane in which an optical axis is folded is a YZ-plane, and a direction in which an axial principal ray travels from the exit pupil to a surface of said viewing optical system closest to the exit pupil is a Z-axis direction, and further a direction perpendicularly intersecting the Z-axis direction and coincident with a direction of decentration of the optical system is a Y-axis direction, and further a direction of an axis that constitutes a right-handed orthogonal coordinate system in combination with the Y- and Z-axes is an X-axis direction, the following conditions are satisfied:

$$-1.0 \leq Dx/Rx \leq 0 \quad (4)$$

$$-1.0 \leq Dy/Ry \leq 0 \quad (5)$$

where Dx is a length in the X-axis direction of said observation image forming member; Dy denotes a length in the Y-axis direction of said observation image forming member; Rx denotes a curvature radius in the X-axis direction of a substrate surface of said holographic element; and Ry denotes a curvature radius in the Y-axis direction of the substrate surface of said holographic element.

13. A head-mounted image display apparatus comprising:
a body unit containing the viewing optical system according to claim 1;
a support member for supporting said body unit on a head of an observer in such a manner that the exit pupil of said viewing optical system is held at a position of an eyeball of the observer; and
a speaker member for giving voice to an ear of the observer.

14. A head-mounted image display apparatus according to claim 13, wherein said body unit has a viewing optical system for a right eye and a viewing optical system for a left eye, and said speaker member has a speaker member for a right ear and a speaker member for a left ear.

15. A head-mounted image display apparatus according to claim 13, wherein said speaker member is an earphone.

16. A viewing optical system comprising:
an observation image forming member for forming an observation image to be viewed by an observer; and
an ocular optical member for leading the observation image formed by said observation image forming member to an exit pupil formed at a position of an observer's eyeball;
said ocular optical member including at least a first prism member and a second prism member;
said first prism member having at least:
a first entrance surface through which light rays from said observation image enter said first prism member;
a reflecting surface reflecting the light rays within said first prism member; and
a first exit surface through which the light rays exit said first prism member;
wherein said first entrance surface, said reflecting surface and said first exit surface are disposed to face each other across a first prism medium;
said second prism member having at least:
a second entrance surface through which the light rays exiting from said first prism member enter said second prism member; and
a second exit surface through which the light rays exit said second prism member;
wherein said second entrance surface and said second exit surface are disposed to face each other across a second prism medium;
said first prism member and said second prism member being cemented together with a holographic element interposed between said first exit surface and said second entrance surface;
wherein said reflecting surface of said first prism member is a concave surface that gives a positive power to the light rays when reflecting them; and
wherein said first exit surface and said second entrance surface are each formed from a spherical surface or a toric surface satisfying the following conditions:

$$-2.0 < Da/Ra < 2.0 \quad (2)$$

$$-0.05 < Db/Rb < 0.05 \quad (3)$$

where Ra and Da are a curvature radius and an outer diameter of the surface in a direction of an axis where the surface has a larger curvature, and Rb and Db are a curvature radius and an outer diameter of the surface in a direction of an axis where the surface has a smaller curvature.

17. A viewing optical system according to claim 16, wherein said first entrance surface of said first prism member has a curved surface configuration that gives a power to the light rays when they pass through said surface, and said second exit surface of said second prism member has a curved surface configuration that gives a power to the light rays when they pass through said surface.

18. A viewing optical system according to claim 16, wherein said first prism medium and said second prism medium are a same medium.

19. A viewing optical system according to claim 16, wherein the first exit surface of said first prism member and the second entrance surface of said second prism member have approximately a same surface configuration.

20. A viewing optical system according to claim 16, wherein a ghost light eliminating member that prevents ghost light from entering the observer's eyeball is provided on a non-optical functional surface other than optical functional surfaces of said first prism member and said second prism member that transmit or reflect the light rays.

21. A viewing optical system according to claim 16, wherein the first entrance surface of said first prism member has a rotationally asymmetric curved surface configuration.

22. A viewing optical system according to claim 16, wherein said holographic element is arranged to correct the light rays for both rotationally symmetric and rotationally asymmetric components of lateral chromatic aberration by reflection and diffraction.

23. A viewing optical system according to claim 16, wherein the following condition (1) is satisfied:

$$45°<\theta<85° \qquad (1)$$

wherein θ is an angle between a tangential plane at a position of intersection between an axial principal ray and a substrate surface of said holographic element and the axial principal ray traveling from a surface of said viewing optical system closest to said exit pupil to reach said exit pupil.

24. A viewing optical system according to claim 16, wherein said second exit surface of said second prism member has a rotationally asymmetric curved surface configuration that corrects at least either one of rotationally asymmetric coma and astigmatism produced in said ocular optical member.

25. A viewing optical system according to claim 16, wherein when a plane in which an optical axis is folded is a YZ-plane, and a direction in which an axial principal ray travels from the exit pupil to a surface of said viewing optical system closest to the exit pupil is a Z-axis direction, and further a direction perpendicularly intersecting the Z-axis direction and coincident with a direction of decentration of the optical system is a Y-axis direction, and further a direction of an axis that constitutes a right-handed orthogonal coordinate system in combination with the Y- and Z-axes is an X-axis direction, the following conditions are satisfied:

$$-1.0 \leq Dx/Rx \leq 0 \qquad (4)$$
$$-1.0 \leq Dy/Ry \leq 0 \qquad (5)$$

where Dx is a length in the X-axis direction of said observation image forming member; Dy denotes a length in the Y-axis direction of said observation image forming member; Rx denotes a curvature radius in the X-axis direction of a substrate surface of said holographic element; and Ry denotes a curvature radius in the Y-axis direction of the substrate surface of said holographic element.

26. A head-mounted image display apparatus comprising:
a body unit containing the viewing optical system according to claim 16;
a support member for supporting said body unit on a head of an observer in such a manner that the exit pupil of said viewing optical system is held at a position of an eyeball of the observer; and
a speaker member for giving voice to an ear of the observer.

27. An image pickup optical system comprising:
an image pickup device placed in an image plane to pick up an image of an object;
an aperture stop placed in a pupil plane to reduce a brightness of a light beam from the object; and
an image-forming optical member disposed between said image plane and said pupil plane to lead said image of the object to said image plane;
said image-forming optical member including at least a second prism member and a first prism member;

said second prism member having at least:
a third entrance surface through which light rays emanating from the object and passing through said aperture stop enter said second prism member; and
a third exit surface through which the light rays exit said second prism member;
wherein said third entrance surface and said third exit surface are disposed to face each other across a second prism medium;
said first prism member having at least:
a fourth entrance surface through which the light rays exiting from said second prism member enter said first prism member;
a reflecting surface reflecting the light rays within said first prism member; and
a fourth exit surface through which the light rays exit said first prism member;
wherein said fourth entrance surface, said reflecting surface and said fourth exit surface are disposed to face each other across a first prism medium;
said second prism member and said first prism member being cemented together with a holographic element interposed between said third exit surface and said fourth entrance surface;
wherein said reflecting surface of said first prism member is a concave surface that gives a positive power to the light rays when reflecting them; and
wherein said third exit surface and said fourth entrance surface are each formed from a plane surface or a cylindrical surface.

28. An image pickup optical system according to claim 27, wherein said fourth exit surface of said first prism member has a curved surface configuration that gives a power to the light rays when they pass through said surface, and said third entrance surface of said second prism member has a curved surface configuration that gives a power to the light rays when they pass through said surface.

29. An image pickup optical system according to claim 27, wherein said first prism medium and said second prism medium are a same medium.

30. An image pickup optical system according to any one of claims 29, wherein the fourth entrance surface of said first prism member and the third exit surface of said second prism member have approximately a same surface configuration.

31. An image pickup optical system according to any one of claims 27, wherein the fourth entrance surface of said first prism member and the third exit surface of said second prism member have approximately a same surface configuration.

32. An image pickup optical system according to claim 27, wherein a ghost light eliminating member that prevents ghost light from entering the image pickup device is provided on a non-optical functional surface other than optical functional surfaces of said first prism member and said second prism member that transmit or reflect the light rays.

33. An image pickup optical system according to claim 27, wherein the fourth exit surface of said first prism member has a rotationally asymmetric curved surface configuration.

34. An image pickup optical system according to claim 33, wherein said rotationally asymmetric curved surface configuration is a free-form surface having only one plane of symmetry, and said plane of symmetry is coincident with a plane (YZ-plane) in which an optical axis is folded.

35. An image pickup optical system according to claim 27, wherein said holographic element is arranged to correct the light rays for both rotationally symmetric and rotationally asymmetric components of lateral chromatic aberration by reflection and diffraction.

36. An image pickup optical system according to claim 27, wherein the following condition (1) is satisfied:

$$45° < \theta < 85° \quad (1)$$

where θ is an angle between a tangential plane at a position of intersection between an axial principal ray and a substrate surface of said holographic element and the axial principal ray traveling from said stop to reach a surface of said image pickup optical system closest to said stop.

37. An image pickup optical system according to claim 29, wherein said third entrance surface of said second prism member has a rotationally asymmetric curved surface configuration that corrects at least either one of rotationally asymmetric coma and astigmatism produced in said image-forming optical member.

38. An image pickup optical system according to claim 27, wherein when a plane in which an optical axis is folded is a YZ-plane, and a direction in which an axial principal ray travels from said stop to a surface of said image pickup optical system closest to said stop is a Z-axis direction, and further a direction perpendicularly intersecting the Z-axis direction and coincident with a direction of decentration of the optical system is a Y-axis direction, and further a direction of an axis that constitutes a right-handed orthogonal coordinate system in combination with the Y- and Z-axes is an X-axis direction, the following conditions are satisfied:

$$-1.0 \leq Dx/Rx \leq 0 \quad (4)$$

$$-1.0 \leq Dy/Ry \leq 0 \quad (5)$$

where Dx is a length in the X-axis direction of said image pickup device; Dy denotes a length in the Y-axis direction of said image pickup device; Rx denotes a curvature radius in the X-axis direction of a substrate surface of said holographic element; and Ry denotes a curvature radius in the Y-axis direction of the substrate surface of said holographic element.

39. An image pickup optical system comprising:
an image pickup device placed in an image plane to pick up an image of an object;
an aperture stop placed in a pupil plane to reduce a brightness of a light beam from the object; and
an image-forming optical member disposed between said image plane and said pupil plane to lead said image of the object to said image plane;
said image-forming optical member including at least a second prism member and a first prism member;
said second prism member having at least:
  a third entrance surface through which light rays emanating from the object and passing through said aperture stop enter said second prism member; and
  a third exit surface through which the light rays exit said second prism member;
  wherein said third entrance surface and said third exit surface are disposed to face each other across a second prism medium;
said first prism member having at least:
  a fourth entrance surface through which the light rays exiting from said second prism member enter said first prism member;
  a reflecting surface reflecting the light rays within said first prism member; and
  a fourth exit surface through which the light rays exit said first prism member;
  wherein said fourth entrance surface, said reflecting surface and said fourth exit surface are disposed to face each other across a first prism medium;
said second prism member and said first prism member being cemented together with a holographic element interposed between said third exit surface and said fourth entrance surface;
wherein said reflecting surface of said first prism member is a concave surface that gives a positive power to the light rays when reflecting them; and
wherein said third exit surface and said fourth entrance surface are each formed from a spherical surface or a toric surface satisfying the following conditions:

$$-2.0 < Da/Ra < 2.0 \quad (2)$$

$$-0.05 < Db/Rb < 0.05 \quad (3)$$

where Ra and Da are a curvature radius and an outer diameter of the surface in a direction of an axis where the surface has a larger curvature, and Rb and Db are a curvature radius and an outer diameter of the surface in a direction of an axis where the surface has a smaller curvature.

40. An image pickup optical system according to claim 27 or 39, wherein when a plane in which an optical axis is folded is a YZ-plane, and a direction in which an axial principal ray travels from said stop to a surface of said image pickup optical system closest to said stop is a Z-axis direction, and further a direction perpendicularly intersecting the Z-axis direction and coincident with a direction of decentration of the optical system is a Y-axis direction, and further a direction of an axis that constitutes a right-handed orthogonal coordinate system in combination with the Y- and Z-axes is an X-axis direction, the following conditions are satisfied:

$$-1.0 \leq Dx/Rx \leq 0 \quad (4)$$

$$-1.0 \leq Dy/Ry \leq 0 \quad (5)$$

where Dx is a length in the X-axis direction of said image pickup device; Dy denotes a length in the Y-axis direction of said image pickup device; Rx denotes a curvature radius in the X-axis direction of a substrate surface of said holographic element; and Ry denotes a curvature radius in the Y-axis direction of the substrate surface of said holographic element.

41. An image pickup optical system according to claim 40, wherein said fourth exit surface of said first prism member has a curved surface configuration that gives a power to the light rays when they pass through said surface, and said third entrance surface of said second prism member has a curved surface configuration that gives a power to the light rays when they pass through said surface.

42. An image pickup optical system according to claim 40, wherein said first prism medium and said second prism medium are a same medium.

43. An image pickup optical system according to claim 40, wherein a ghost light eliminating member that prevents ghost light from entering the image pickup device is provided on a non-optical functional surface other than optical functional surfaces of said first prism member and said second prism member that transmit or reflect the light rays.

44. An image pickup optical system according to claim 40, wherein the fourth exit surface of said first prism member has a rotationally asymmetric curved surface configuration.

45. An image pickup optical system according to claim 40, wherein said holographic element is arranged to correct the light rays for both rotationally symmetric and rotationally asymmetric components of lateral chromatic aberration by reflection and diffraction.

46. An image pickup optical system according to claim 40, wherein the following condition (1) is satisfied:

$$45° < \theta 85° \tag{1}$$

where θ is an angle between a tangential plane at a position of intersection between an axial principal ray and a substrate surface of said holographic element and the axial principal ray traveling from said stop to reach a surface of said image pickup optical system closest to said stop.

47. An image pickup optical system according to claim 40, wherein said third entrance surface of said second prism member has a rotationally asymmetric curved surface configuration that corrects at least either one of rotationally asymmetric coma and astigmatism produced in said image-forming optical member.

48. An image pickup optical system according to claim 40, wherein when a plane in which an optical axis is folded is a YZ-plane, and a direction in which an axial principal ray travels from said stop to a surface of said image pickup optical system closest to said stop is a Z-axis direction, and further a direction perpendicularly intersecting the Z-axis direction and coincident with a direction of decentration of the optical system is a Y-axis direction, and further a direction of an axis that constitutes a right-handed orthogonal coordinate system in combination with the Y- and Z-axes is an X-axis direction, the following conditions are satisfied:

$$-1.0 \leq Dx/Rx \leq 0 \tag{4}$$

$$-1.0 \leq Dy/Ry \leq 0 \tag{5}$$

where Dx is a length in the X-axis direction of said image pickup device; Dy denotes a length in the Y-axis direction of said image pickup device; Rx denotes a curvature radius in the X-axis direction of a substrate surface of said holographic element; and Ry denotes a curvature radius in the Y-axis direction of the substrate surface of said holographic element.

* * * * *